US010901475B2

(12) United States Patent
Volek et al.

(10) Patent No.: US 10,901,475 B2
(45) Date of Patent: Jan. 26, 2021

(54) COMPUTER DOCKING STATION

(71) Applicant: Humanscale Corporation, New York, NY (US)

(72) Inventors: Robert Volek, Brooklyn, NY (US); Steve Bender, Fairfield, CT (US); David Wong, New York, NY (US)

(73) Assignee: Humanscale Corporation, New York, NY (US)

( * ) Notice: Subject to any disclaimer, the term of this patent is extended or adjusted under 35 U.S.C. 154(b) by 0 days.

(21) Appl. No.: 16/733,051

(22) Filed: Jan. 2, 2020

(65) Prior Publication Data

US 2020/0133368 A1 Apr. 30, 2020

Related U.S. Application Data

(63) Continuation-in-part of application No. 15/720,762, filed on Sep. 29, 2017, which is a continuation of application No. 15/179,705, filed on Jun. 10, 2016, now Pat. No. 9,804,652.

(60) Provisional application No. 62/212,828, filed on Sep. 1, 2015.

(51) Int. Cl.
*G06F 1/26* (2006.01)
*G06F 1/16* (2006.01)
*H02J 7/00* (2006.01)

(52) U.S. Cl.
CPC ............ *G06F 1/266* (2013.01); *G06F 1/1601* (2013.01); *G06F 1/1632* (2013.01); *H02J 7/00* (2013.01); *H02J 7/0042* (2013.01)

(58) Field of Classification Search
None
See application file for complete search history.

(56) References Cited

U.S. PATENT DOCUMENTS

| 413,571 A | 10/1889 | Sleeper |
| 5,497,214 A | 3/1996 | Labree |
| 5,713,549 A * | 2/1998 | Shieh .................... F16M 11/18 248/284.1 |
| 5,924,892 A | 7/1999 | Ferracina |
| 6,004,157 A | 12/1999 | Glass |
| 6,134,612 A | 10/2000 | Bailey et al. |

(Continued)

FOREIGN PATENT DOCUMENTS

WO 2015161695 10/2015

OTHER PUBLICATIONS

PCT/US2016/037107, Search Report and Written Opinion, ISA/US, dated Sep. 2, 2016.

*Primary Examiner* — Xanthia C Cunningham
(74) *Attorney, Agent, or Firm* — Jones Walker LLP

(57) ABSTRACT

A computer docking station devised to save desktop space while also eliminating the presence of permanent cables that can clutter the work surface is disclosed. The computer docking station utilizes a split design, with a lower dock subassembly positioned beneath the work surface for housing the permanent cables necessary for the computer workstation to operate and an upper dock subassembly comprising one or more data ports positioned on top of the work surface. A monitor arm mount can be attached to, or integrated into, the upper dock subassembly, thereby alleviating the need for a separate monitor arm mount without negatively impacting the docking station's footprint.

20 Claims, 23 Drawing Sheets

(56) References Cited

U.S. PATENT DOCUMENTS

| | | | |
|---|---|---|---|
| 6,418,010 B1 * | 7/2002 | Sawyer | F16M 11/14 |
| | | | 361/679.05 |
| 6,476,884 B1 | 11/2002 | Shao | |
| 6,519,143 B1 | 2/2003 | Goko | |
| 6,540,554 B2 | 4/2003 | McCarthy | |
| 6,589,073 B2 | 7/2003 | Lee | |
| 6,987,666 B2 | 1/2006 | Medica et al. | |
| D515,033 S | 2/2006 | Petrick et al. | |
| 7,061,754 B2 | 6/2006 | Moscovitch | |
| 7,215,538 B1 | 5/2007 | Chen et al. | |
| D584,734 S * | 1/2009 | Chu | D14/452 |
| D595,298 S * | 6/2009 | Zonshine | D14/451 |
| D638,360 S * | 5/2011 | Kan | D13/139.4 |
| D685,806 S * | 7/2013 | Kim | D14/451 |
| 8,842,427 B2 | 9/2014 | Yoshimura et al. | |
| 9,148,006 B2 | 9/2015 | Byrne et al. | |
| 9,153,112 B1 | 10/2015 | Kiani et al. | |
| 9,161,464 B2 | 10/2015 | Liao | |
| 9,565,930 B2 | 2/2017 | Gwag | |
| 2003/0086240 A1 | 5/2003 | Jobs et al. | |
| 2003/0122973 A1 | 7/2003 | Huang | |
| 2005/0079769 A1 | 4/2005 | Strayer | |
| 2005/0170687 A1 | 8/2005 | Goh | |
| 2007/0088875 A1 | 4/2007 | Martin et al. | |
| 2007/0139870 A1 | 6/2007 | Lin | |
| 2007/0275594 A1 | 11/2007 | Greenberg | |
| 2010/0323559 A1 | 12/2010 | Chambers | |
| 2011/0108698 A1 | 5/2011 | Chen | |
| 2011/0287665 A1 | 11/2011 | Chien | |
| 2011/0303805 A1 | 12/2011 | Lau et al. | |
| 2012/0117467 A1 | 5/2012 | Maloney et al. | |
| 2013/0071176 A1 | 3/2013 | Chen et al. | |
| 2014/0367137 A1 | 12/2014 | Leung | |
| 2015/0192971 A1 | 7/2015 | Shah | |

* cited by examiner

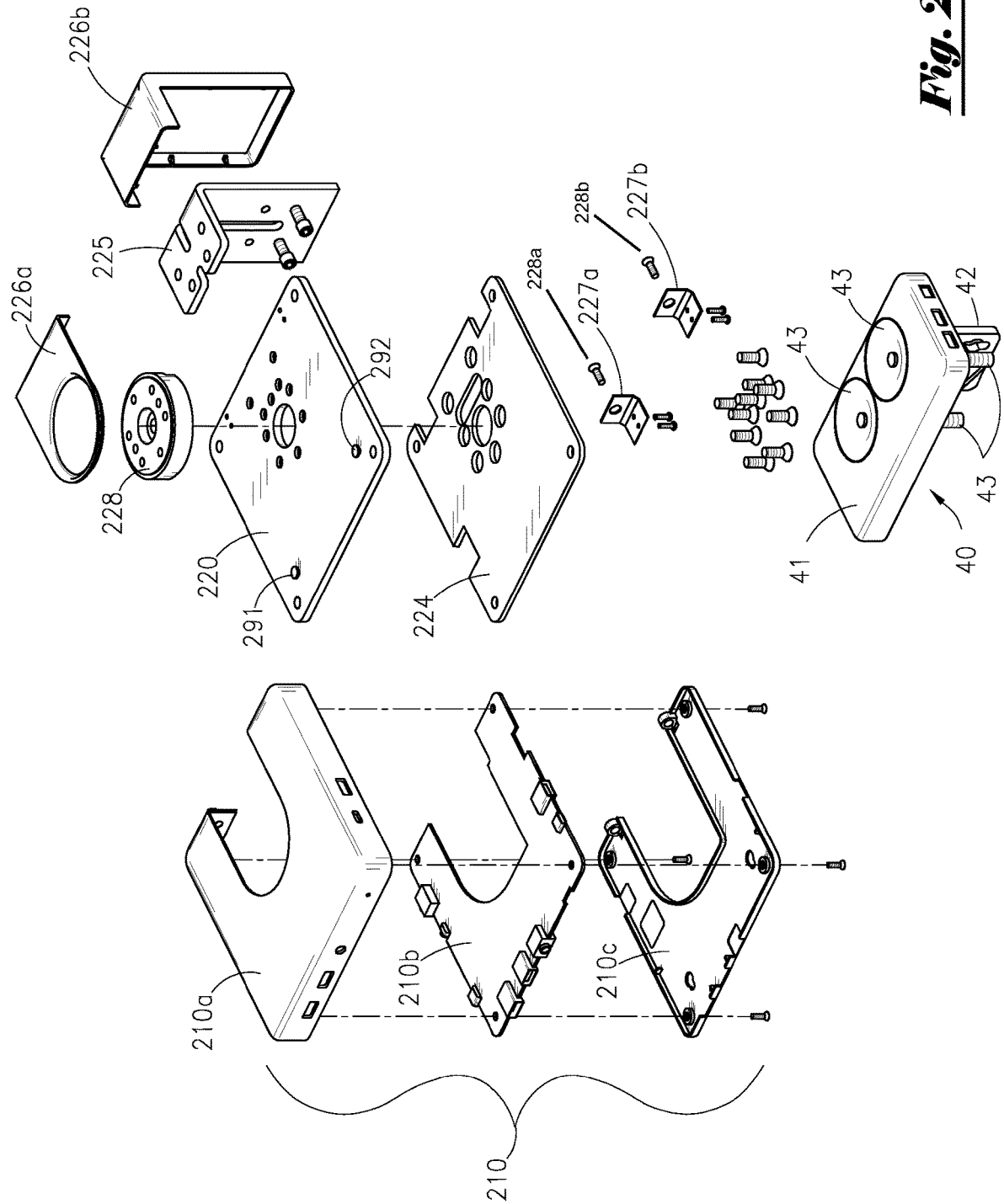

COMPUTER DOCKING STATION

CROSS-REFERENCE TO RELATED APPLICATIONS

This application is a continuation-in-part of U.S. application Ser. No. 15/720,762, filed Sep. 29, 2017, which in turn is a continuation of U.S. application Ser. No. 15/179,705, filed Jun. 10, 2016, which claims the benefit of U.S. Provisional Application No. 62/212,828, filed Sep. 1, 2015, all of which are incorporated by reference herein in their entireties.

BACKGROUND

Advances in processors, battery life, and visual displays have vastly improved the performance possibilities of laptop computers. With wireless mobility and connectivity becoming a necessity in today's business environment, many businesses and entrepreneurs have chosen to use laptop computers in lieu of desktops in the workplace. However, laptops typically have smaller keyboards than the standard keyboards utilized with desktops, and a standard mouse is generally preferred by users in the office environment over the built-in touchpad or trackpad of laptop computers. In addition, prolonged use of a laptop alone can be an uncomfortable experience for the user.

A docking station allows laptop computers to become a substitute for a desktop computer without sacrificing the mobile computing functionality of the machine. For example, port replicator-type docking stations allow multiple peripherals—such as a keyboard, a printer, a mouse, and/or one or more monitors—to be connected to the laptop simultaneously by simply connecting the laptop to the docking station. Thus, the user can get access to an external full-sized keyboard, standard mouse, full-size monitor(s), a printer/scanner and a wired network connection when working in the office environment. Ergonomic positioning of the external keyboard and monitor allow the user to assume a more comfortable, neutral posture at the workstation, thus reducing the musculoskeletal stress typically associated with the prolonged use of laptop computers.

In a typical office configuration, the docking station will be located on the work surface to allow the user to easily connect the laptop to the dock. However, while this location provides the convenience of a quick and easy connection to the laptop, the docking station can take up valuable workspace, regardless of whether a vertical stand-alone docking station or a horizontal style docking station is utilized. Moreover, current generation docking stations positioned on the work surface leave the permanent cables exposed on the work surface, creating a cluttered work environment.

SUMMARY

The invention disclosed herein is directed to a computer docking station devised to save desktop space while also eliminating the presence of permanent cables that can clutter the work surface. Whereas prior art computer docking stations typically are unitary units that take up valuable space on the work surface, the computer docking station of the present invention significantly reduces the docking station's desktop footprint by utilizing a split design, with a lower dock subassembly positioned beneath the work surface for housing the permanent cables necessary for the computer workstation to operate, and an upper dock subassembly comprising one or more data ports positioned on top of the work surface. In certain embodiments, a monitor arm mount can also be integrated into the upper dock subassembly, thereby alleviating the need for a separate monitor arm mount without negatively impacting the docking station's footprint. The split-design computer docking station of the present invention provides for improved accessibility to commonly used ports such as universal serial bus (USB) ports, high-speed charging port(s) and audio/microphone ports, while eliminating unsightly permanent cables (e.g., power, video, and network cables) from the desktop, which not only improves aesthetics and the amount of available desk space, but also eliminates the safety hazard of having cables on the work surface and prevents users from intentionally or unintentionally tampering with permanent cables.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages in accordance with the present invention:

FIG. 24 is an exploded view of an embodiment of the upper dock subassembly of the computer docking station shown in FIG. 20.

DETAILED DESCRIPTION

Figure 1:
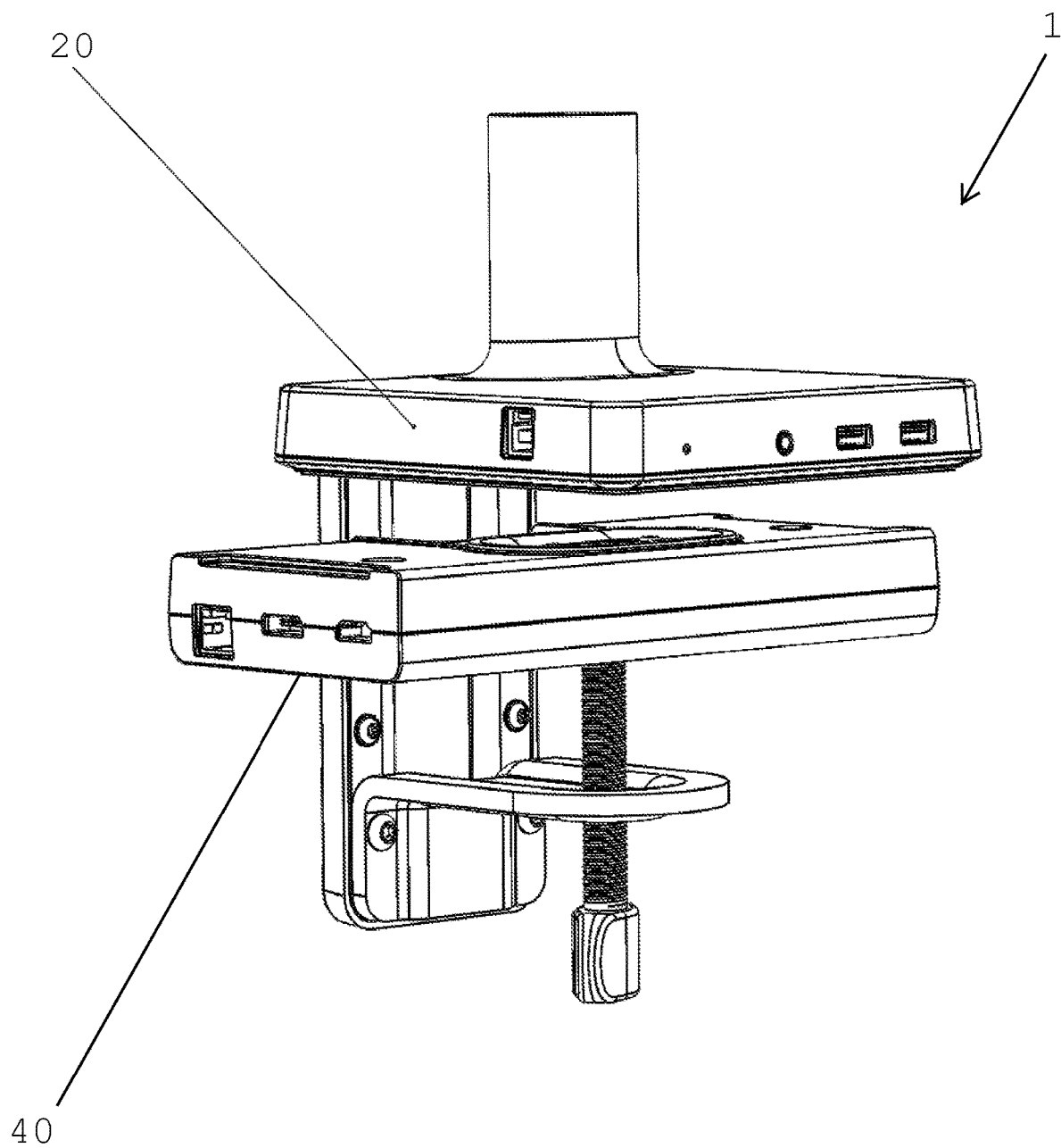
FIG. 1 is a front perspective view of an embodiment of a computer docking station.
Figure 2:
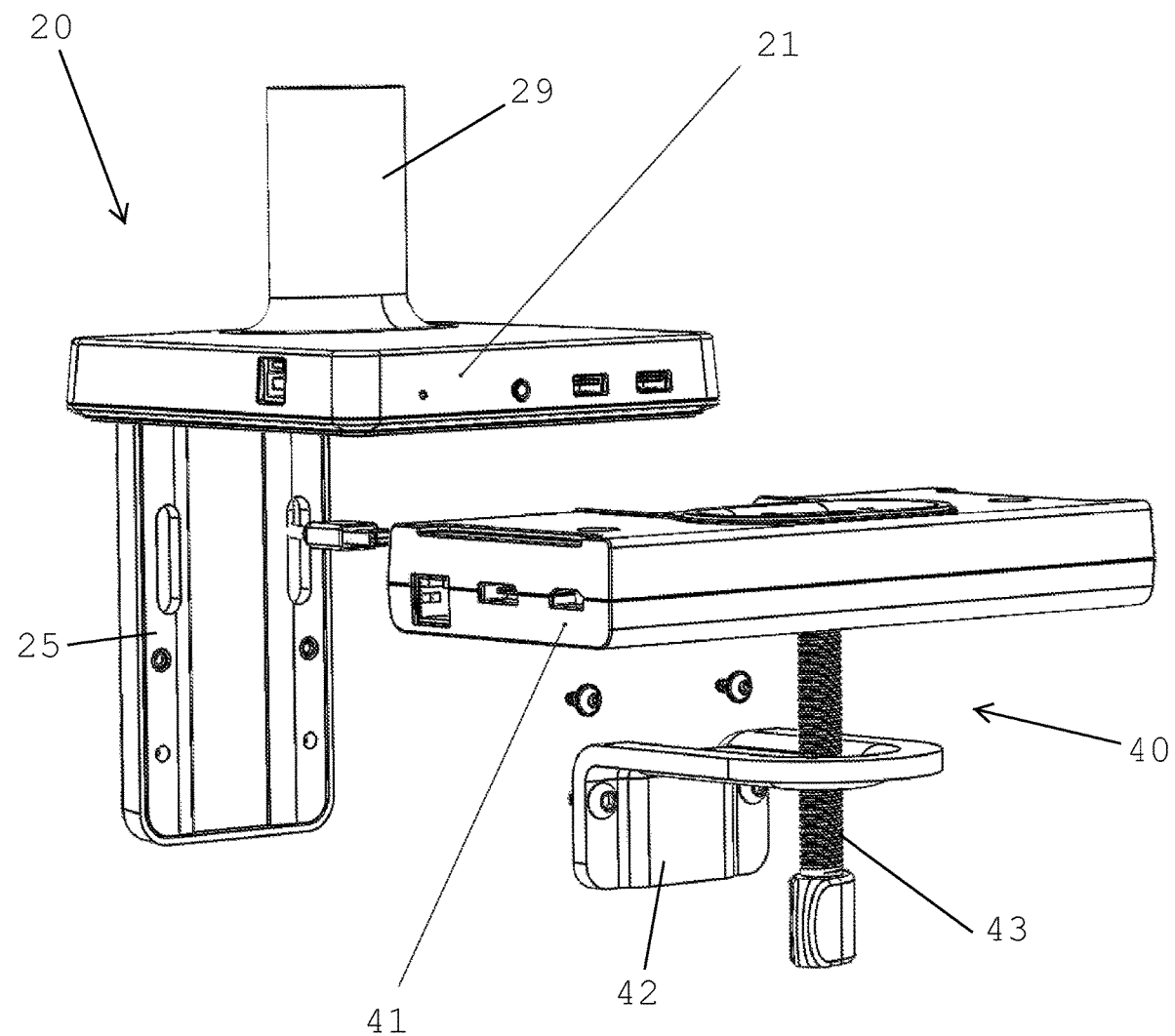
FIG. 2 is a partially exploded view of the embodiment of the computer docking station shown in FIG. 1.
Figure 3:
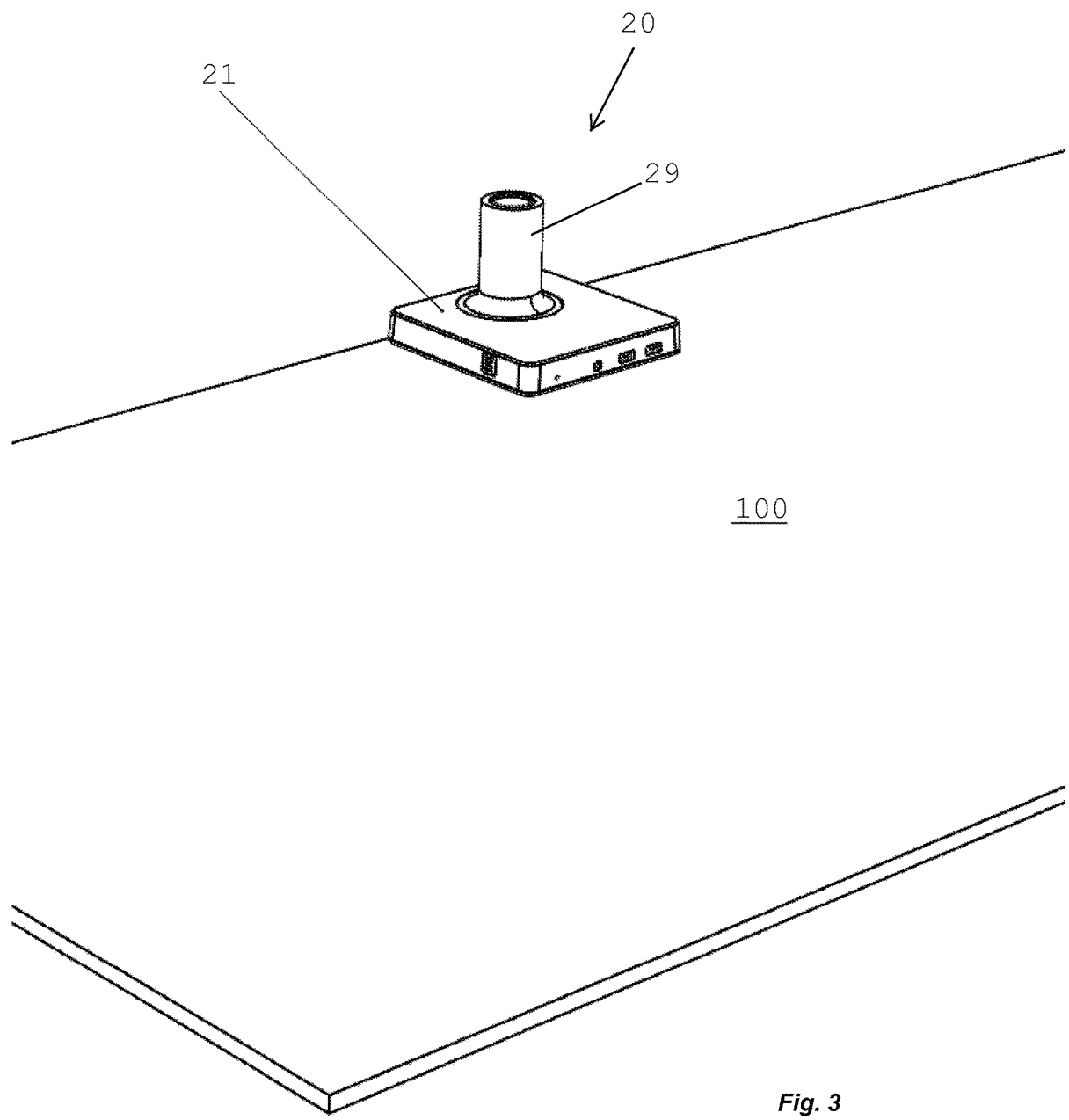
FIG. 3 is a front perspective view of the embodiment of the computer docking station shown in FIG. 1 wherein the computer docking station is mounted to a table.
Figure 4:
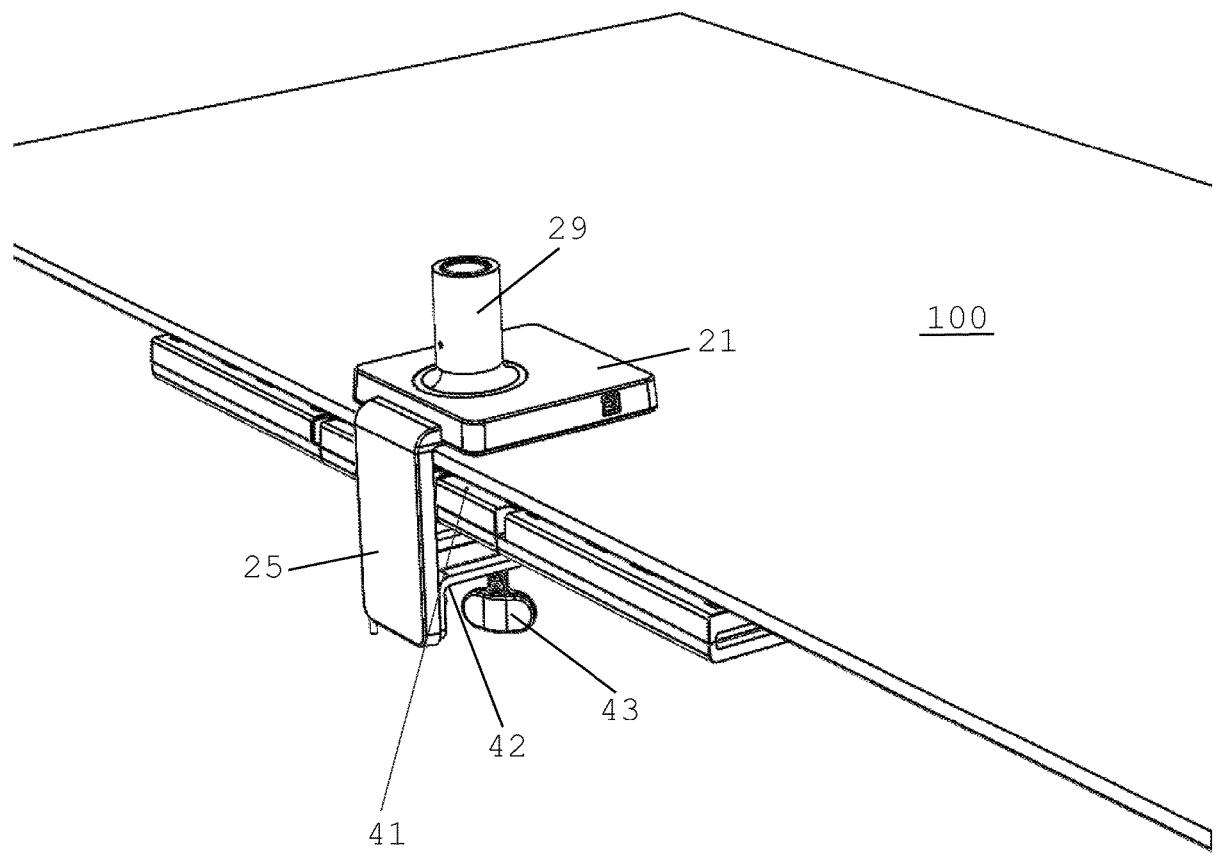
FIG. 4 is a rear perspective view of the embodiment of the computer docking station shown in FIG. 1 wherein the computer docking station is mounted to a table.
Figure 5:
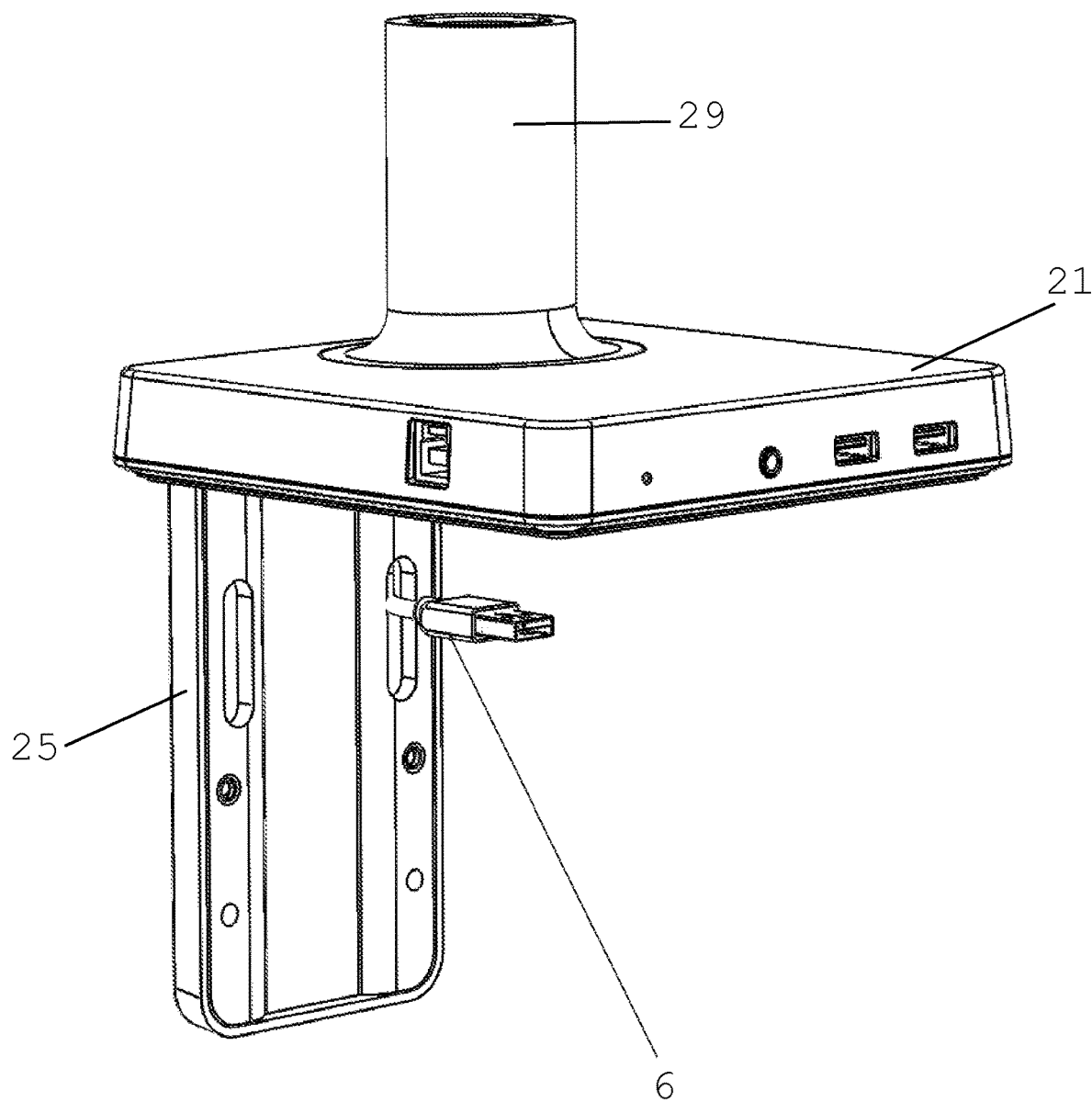
FIG. 5 is a front perspective view of an embodiment of the upper dock subassembly of the computer docking station shown in FIG. 1.
Figure 6:
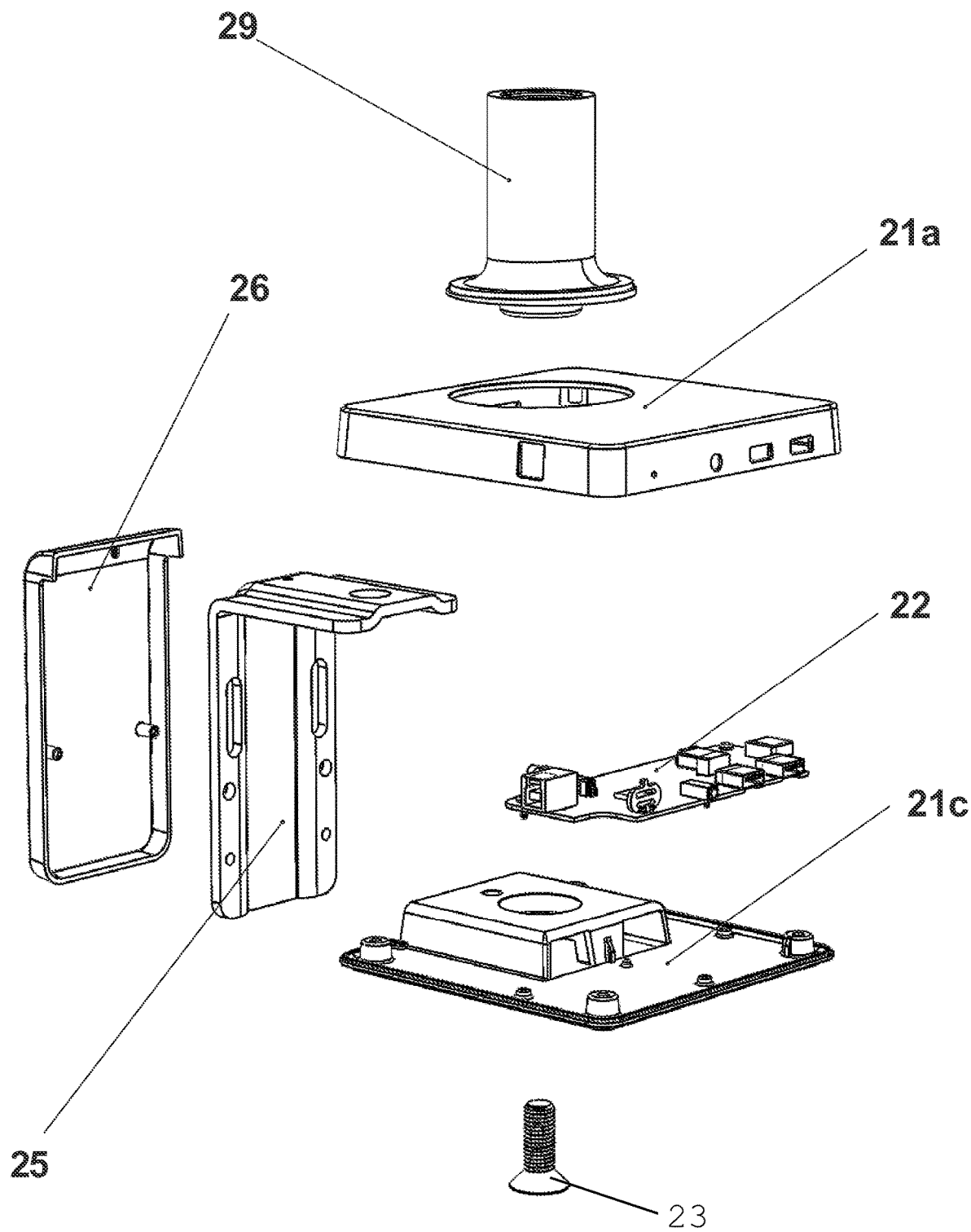
FIG. 6 is an exploded view of an embodiment of the upper dock subassembly of the computer docking station shown in FIG. 1.
Figure 7:
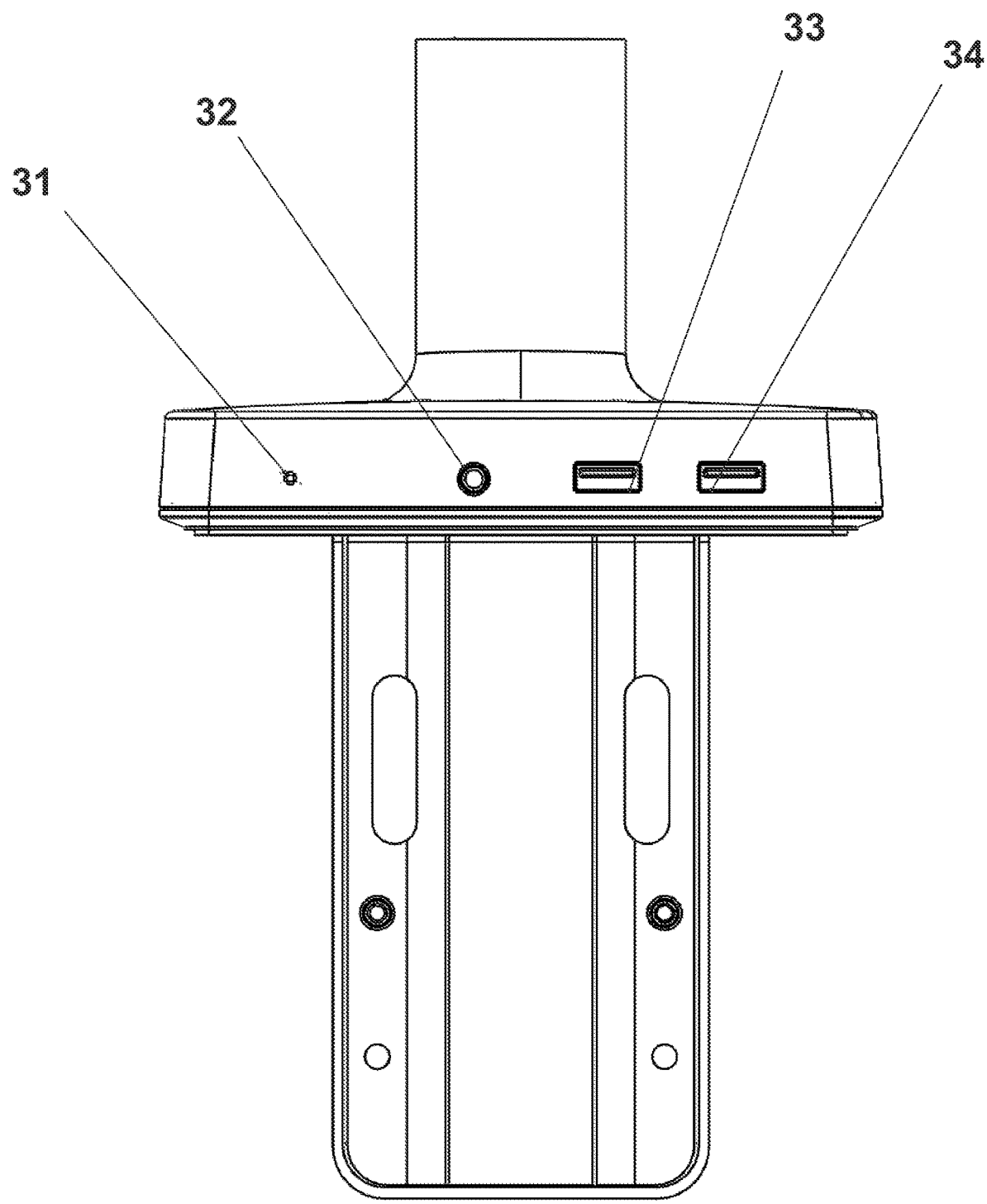
FIG. 7 is a front view of an embodiment of the upper dock subassembly of the computer docking station shown in FIG. 1.
Figure 8:
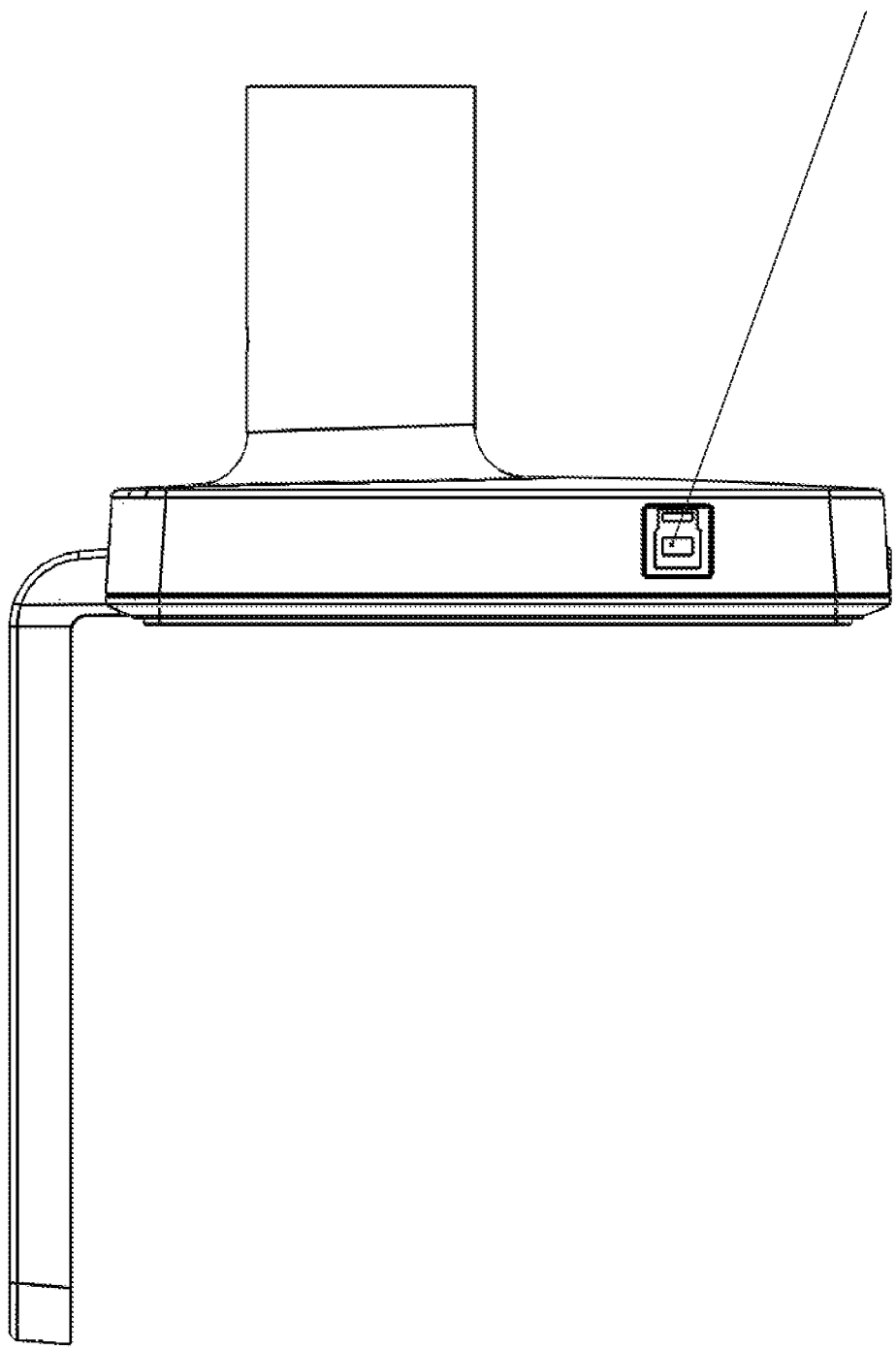
FIG. 8 is a left side view of an embodiment of the upper dock subassembly of the computer docking station shown in FIG. 1.
Figure 9:
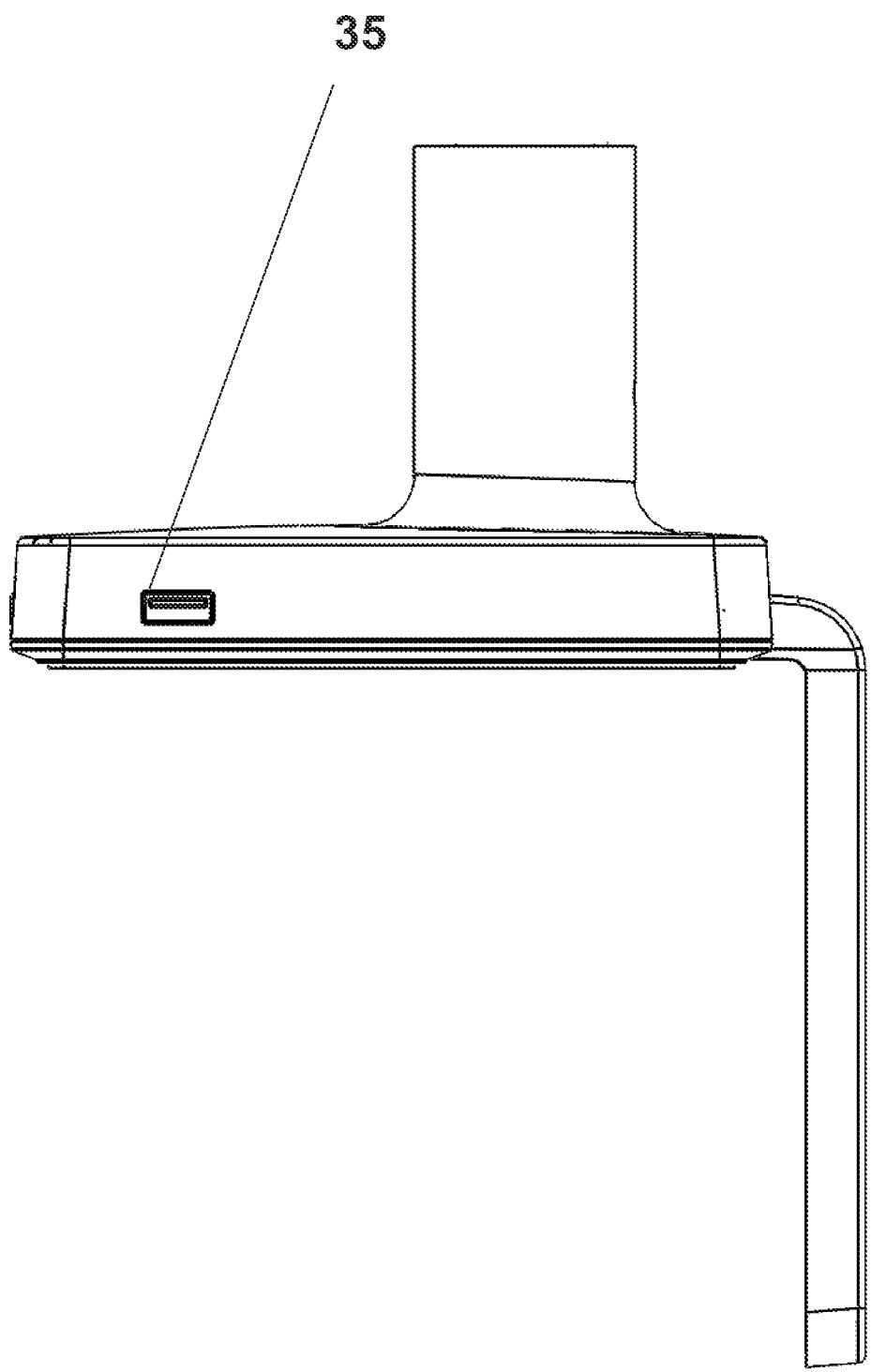
FIG. 9 is a right side view of an embodiment of the upper dock subassembly of the computer docking station shown in FIG. 1.
Figure 10:
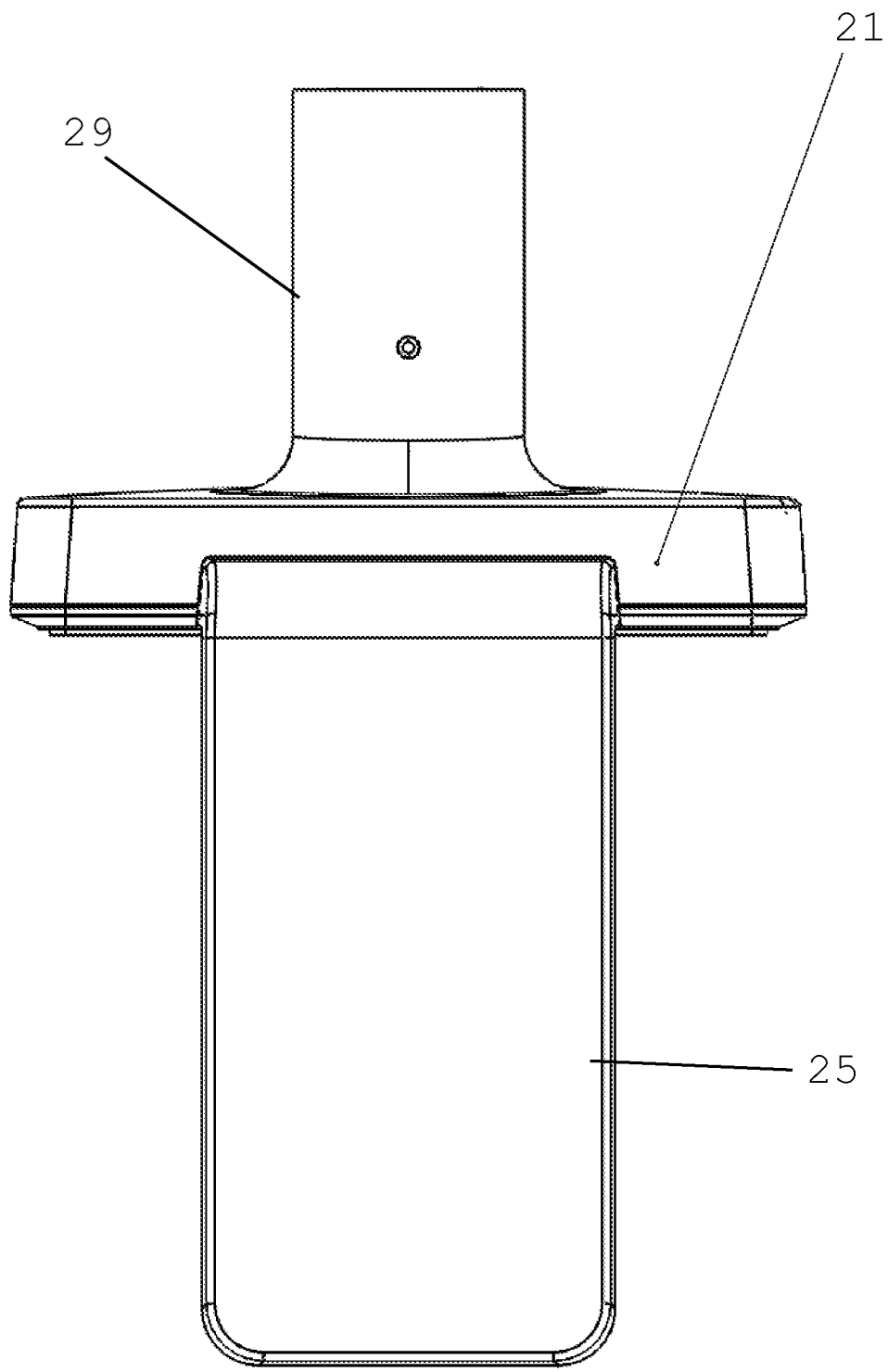
FIG. 10 is a rear view of an embodiment of the upper dock subassembly of the computer docking station shown in FIG. 1.
Figure 11:
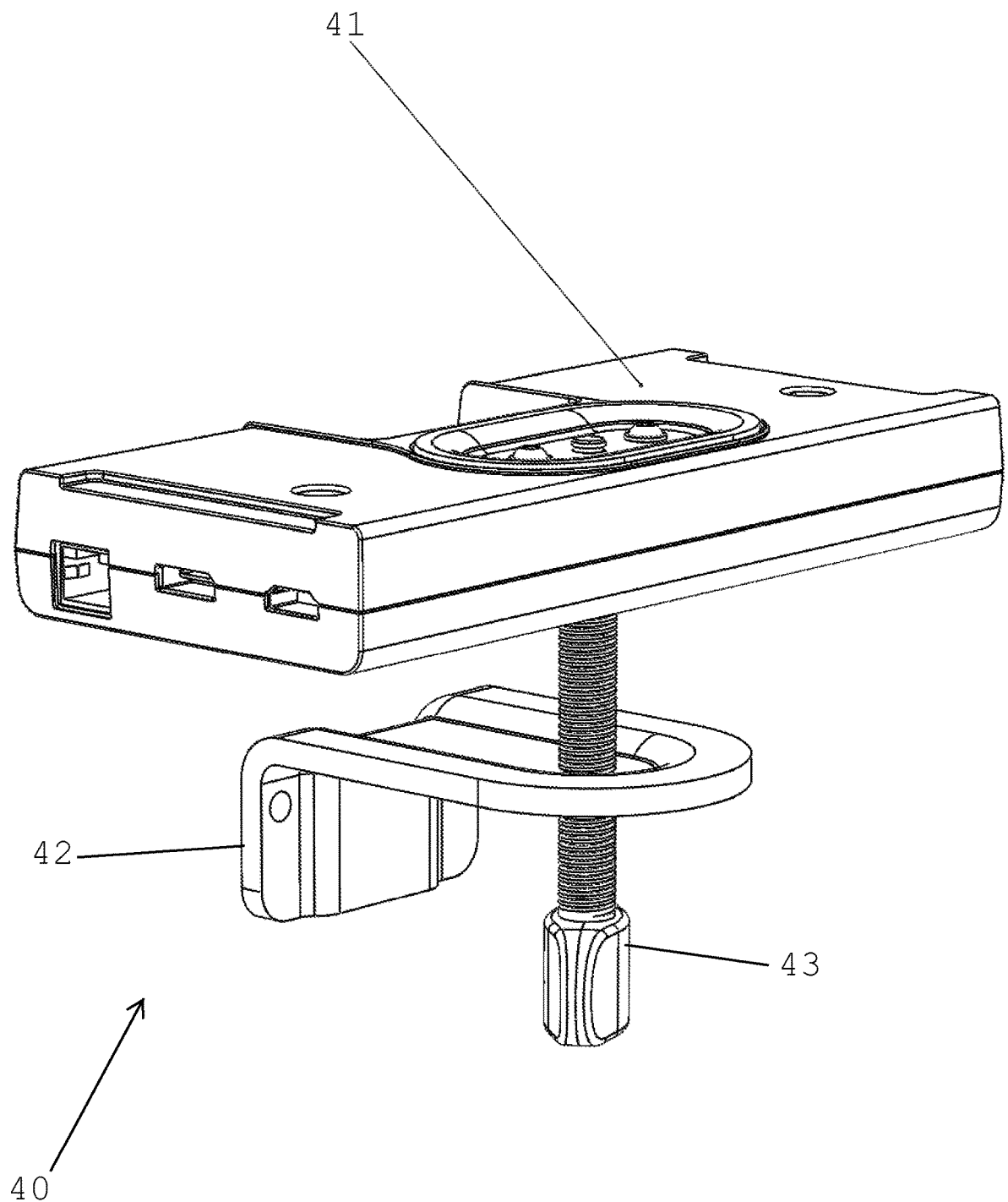
FIG. 11 is a front perspective view of an embodiment of the lower dock subassembly of the computer docking station shown in FIG. 1.
Figure 12:
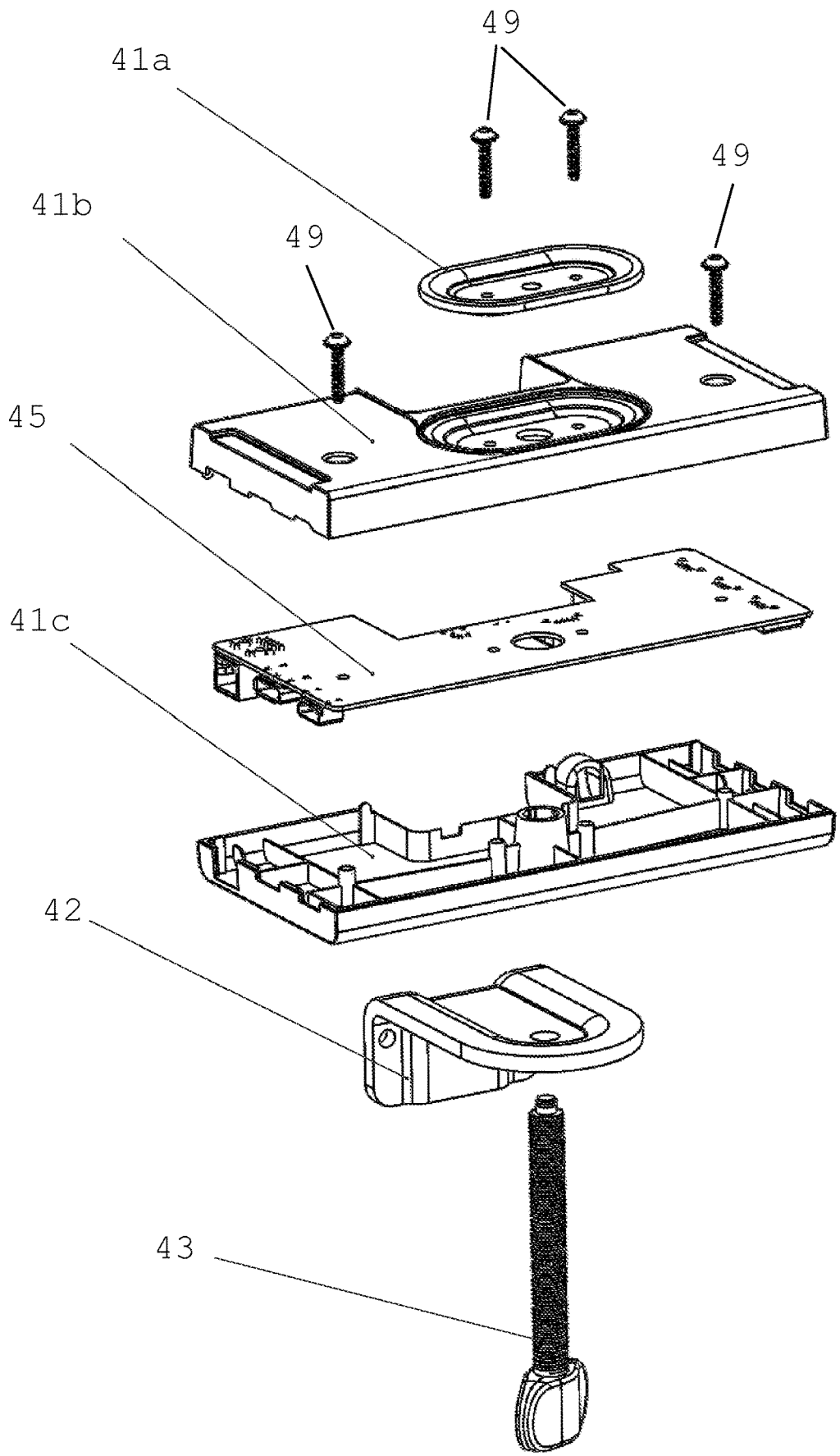
FIG. 12 is an exploded view of an embodiment of the lower dock subassembly of the computer docking station shown in FIG. 1.
Figure 13:
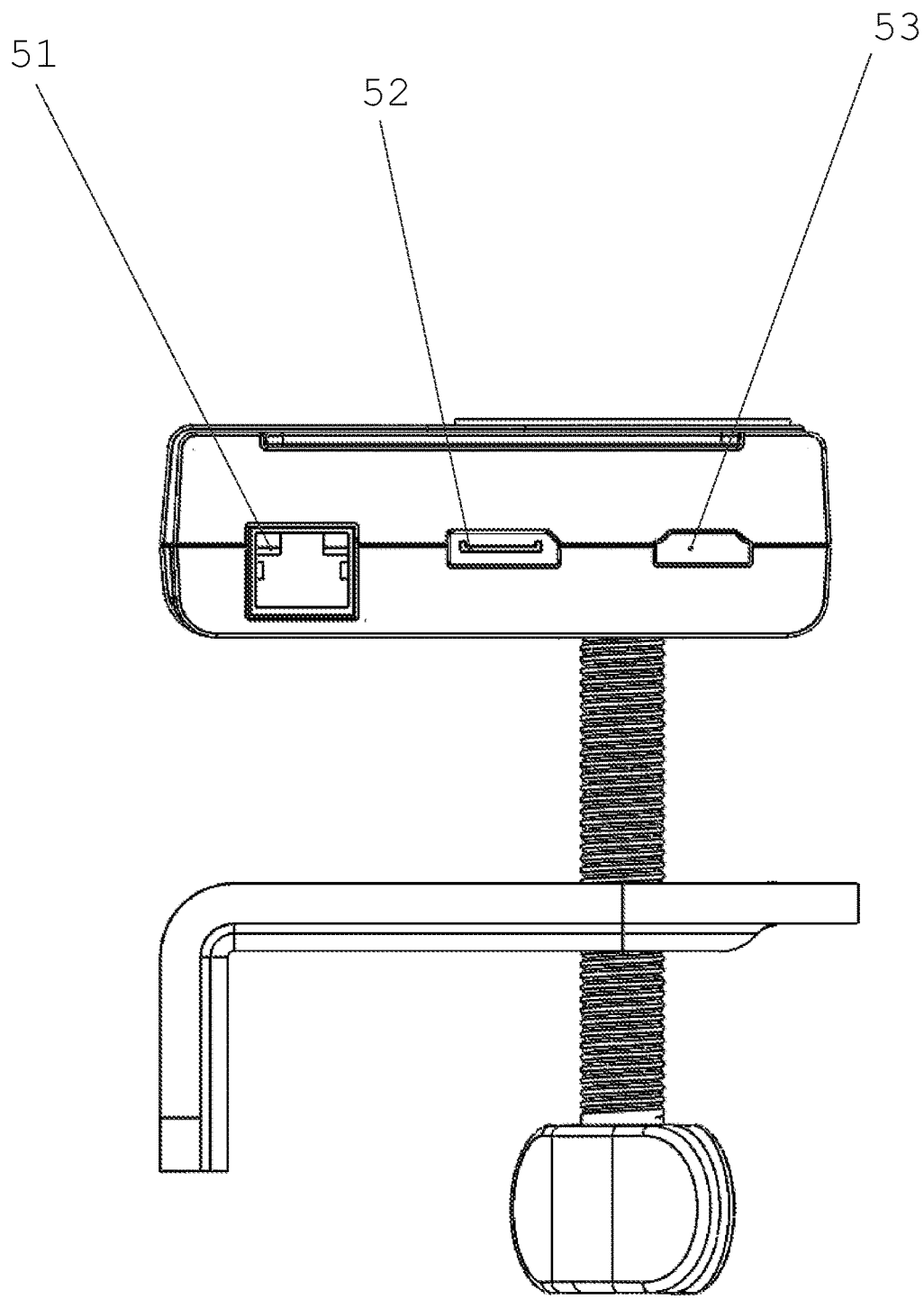
FIG. 13 is a left side view of an embodiment of the lower dock subassembly of the computer docking station shown in FIG. 1.
Figure 14:
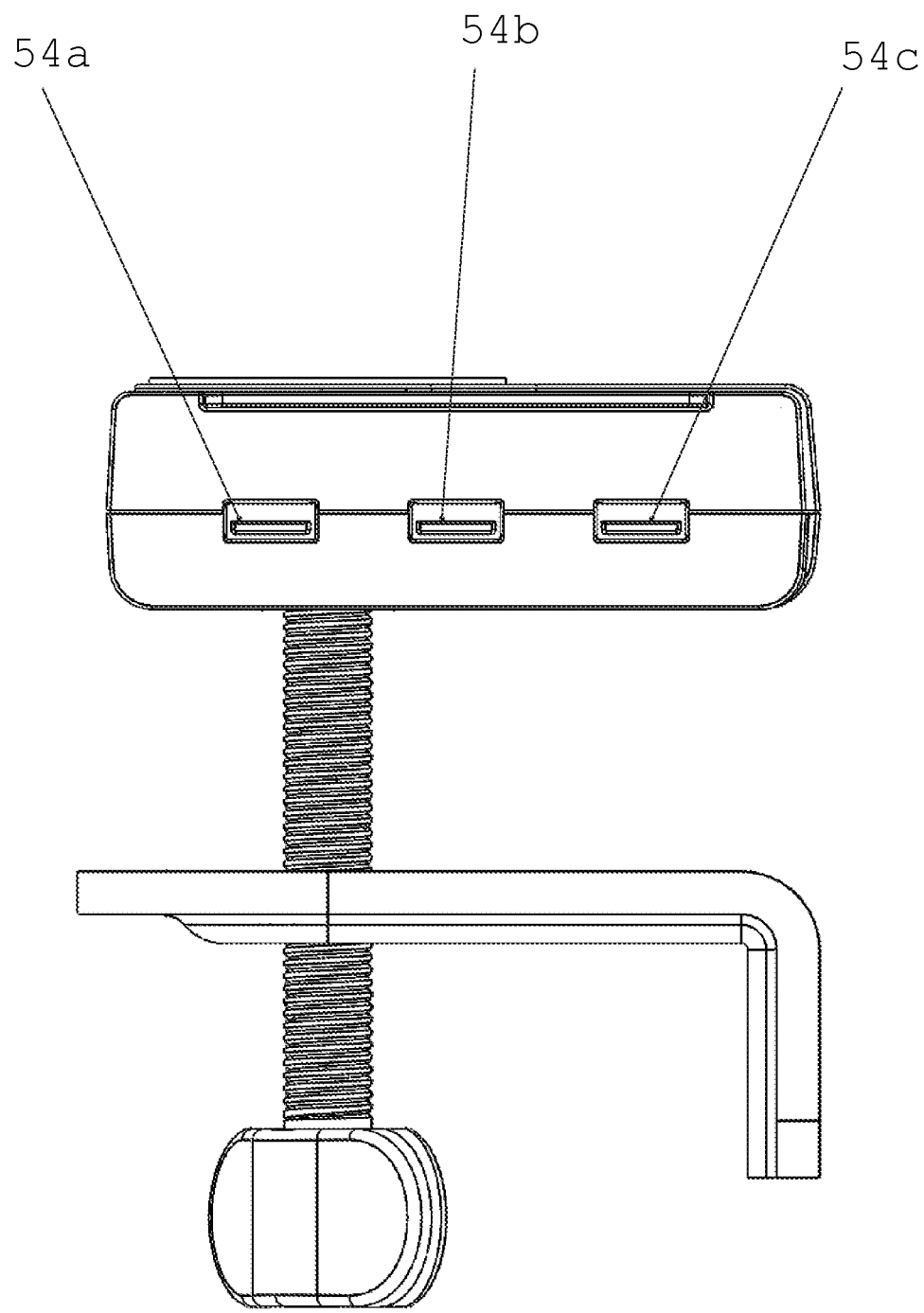
FIG. 14 is a right side view of an embodiment of the lower dock subassembly of the computer docking station shown in FIG. 1.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, top and bottom, right and left, and the like may be used solely to distinguish one entity or action from another entity or action without necessarily requiring or implying any actual such relationship or order between such entities or actions.

Described now are exemplary embodiments of the present invention. An exemplary embodiment of the computer docking station is depicted in FIGS. 1-19. Referring to FIGS. 1-5, the computer docking station 1 can comprise an upper dock subassembly 20 connected to a lower dock subassembly 40. The upper dock subassembly 20 is designed to house active data port connectors (i.e., frequently connected/disconnected), while the lower dock subassembly 40 is designed to house passive data port connectors (i.e., infrequently connected/disconnected). The upper dock subassembly 20 can include a data port hub 21, a monitor arm mount 29, and a bracket 25. The monitor arm mount 29 is preferably attached or integrated into the top of the data port hub 21, while the bracket 25 is preferably attached to the rear or bottom of the data port hub 21. The lower dock subassembly 40 can include a lower subassembly printed circuit board assembly (PCBA) 45 positioned within a lower dock housing 41. A means for securing the lower dock subassembly 40 to the bottom of a work surface 100 can comprise a clamp support or bracket 42 and a screw 43. The lower dock housing 41 and clamp support 42 can be attached to the bracket 25 of the upper dock subassembly 20 with one or more fasteners. Meanwhile, the screw 43 is threadingly engaged with the clamp support 42. In order to secure the computer docking station 1 to a work surface or table 100, the user can rotate the screw 43 until the screw's distal end comes into contact with the underside of the work surface 100. In a preferred embodiment, the lower dock housing 41 of the lower dock subassembly 40 is attached to the bracket 25 of the upper dock subassembly 20 with a sufficient space in-between to accommodate a work surface 100 of varying thicknesses.

A variety of alternative mechanisms can be utilized to mount the lower dock subassembly 40 and the upper dock subassembly 20 to the work surface. For example, in a first alternative embodiment, the clamp support 42 and screw 43 can be replaced with a fixed bracket that permanently attaches the computer docking station 1 to the work surface. In a second alternative embodiment, the clamp support 42 and screw 43 can be replaced with a means for removably mounting the computer docking station 1 to a slat wall. In a third alternative embodiment, the computer docking station 1 can utilize separate brackets to mount the lower dock subassembly 40 and the upper dock subassembly 20 to the work surface, thereby allowing for greater flexibility in mounting locations for each subassembly. In a fourth alternative embodiment, the upper dock subassembly 20 can be secured to the work surface, while the lower dock subassembly 40 is free hanging from a flexible connector to the upper dock subassembly 20, thereby allowing the user to quickly adjust the positioning of the lower dock subassembly 40 relative to the upper dock subassembly 20. While FIGS. 1-19 depict the upper and lower dock subassemblies 20,40 positioned in a horizontal orientation, one skilled in the art will readily appreciate that either or both of the dock subassemblies 20,40 can alternatively be positioned in a vertical orientation.

The active data port connectors of the upper dock subassembly 20 can be linked to the internal components of the lower dock subassembly 40 via one or more bridge cables 6. In a preferred embodiment, a single bridge cable 6 is utilized to connect the active data port connectors of the upper dock subassembly 20 to the internal components of the lower dock subassembly 40. In alternative embodiments, multiple bridge cables 6 can be utilized to link the various data ports, or the bridge cable(s) 6 can be replaced with wireless connection.

Referring now to FIGS. 6-10, the upper dock subassembly 20 can feature a data port hub 21, a monitor arm mount 29, a bracket 25, and one or more data ports 32-36. The data port hub 21 can comprise a hub cover 21*a* attached to a hub base 21*c* for housing an upper subassembly printed circuit board assembly (PCBA) 22, while also providing sufficient rigidity to support the weight of one or more monitors attached to the upper dock subassembly 20. The hub cover 21*a* the hub base 21*c*, the bracket 25, and the monitor arm mount 29 can be connected with one or more fasteners 23, can be molded with snap-fit joints, or can be attached by any other means known in the art. In certain embodiments, a bracket cover 26 can be utilized to secure and hide the one or more bridge cables 6 linking the active data port connectors of the upper dock subassembly 20 to the internal components of the lower dock subassembly 40.

In the exemplary embodiment depicted in FIGS. 7-10, the upper subassembly PCBA 22 can feature an indicator light 31 and one or more data ports 32-36. The indicator light 31 functions to provide the user feedback regarding the operation status of the computer docking station 1. Data port 32 can be an audio combo jack port, while data ports 33, 34 and 35 preferably are USB-A 3.0 SS (SuperSpeed, 0.9 A) data ports which allow users to connect USB peripherals and mobile devices to the user's laptop via the computer docking station 1. In an exemplary embodiment, data port 33 is a USB 3.0 BC 1.2 (1.5 A) charging port, while data ports 34 and 35 are USB-C ports capable to be used for both connectivity and power. Data port 36 can comprise a USB 3.0 B-Type upstream connector port designed to be linked to the user's laptop. The USB 3.0 B-Type upstream connector port 36 allows for the transfer of data, video and audio information between the computer and peripherals through the computer docking station 1, as well as the transfer of power when USB C-Type connector cables are utilized. In alternative embodiments, one skilled in the art will readily acknowledge that the locations and types of data ports 32-36 can easily be modified to adapt to changing technologies and uses of the data ports. For example, the back of the data port hub can be used to accommodate one or more of the data ports 32-36. In certain embodiments the upper subassembly PCBA 22 can also feature a wireless charging platform for mobile devices.

Referring now to FIGS. 11-16, the lower dock subassembly 41 of the lower dock subassembly 40 can comprise a clamp foot 41*a*, a top member 41*b* and a bottom member 41*c*. The clamp foot 41*a* is attached to the top member 41*b*, while the top member 41*b* is attached to the bottom member 41*c* to provide a housing for the lower subassembly PCBA 45. The clamp foot 41*a*, the top member 41*b* and the bottom member 41*c* can be connected with one or more fasteners 49, can be molded with snap-fit joints, or can be attached by any other means known in the art.

In the exemplary embodiment depicted in FIGS. 7-10, the lower subassembly PCBA 45 features one or more power and data ports 51-58. Data port 51 can comprise a RJ45 100 Mbit Ethernet connector for providing the user's laptop with a wired internet connection through the computer docking station 1. Data port 52 can comprise a Display Port connector and data port 53 can comprise an HDMI connector for allowing monitor(s) to be connected to the computer docking station 1. Alternatively, these data port could be a DVI, HDMI or USB-C type connectors/ports. Data ports 54*a-c* can be USB-A 3.0 SS (SuperSpeed, 0.9 A) data ports which allow users to connect USB peripherals to the user's laptop via the computer docking station 1. In alternative embodiments, data ports 54*a-c* can be any type of USB port, including but not limited to USB 3.0 BC 1.2 (1.5 A) charging ports and USB-C ports.

Figure 15:
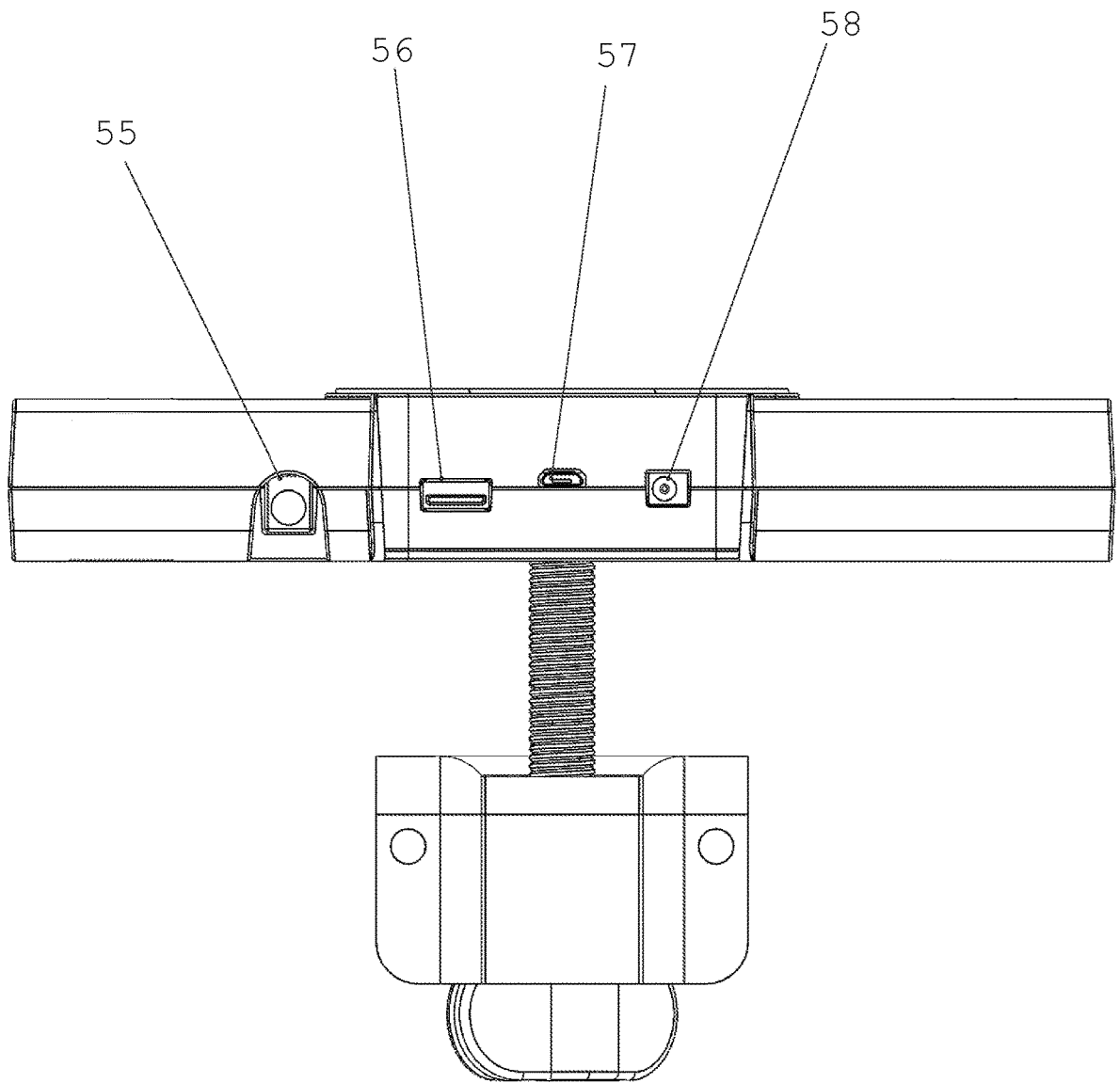
FIG. 15 is a rear view of an embodiment of the lower dock subassembly of the computer docking station shown in FIG. 1.
Figure 16:
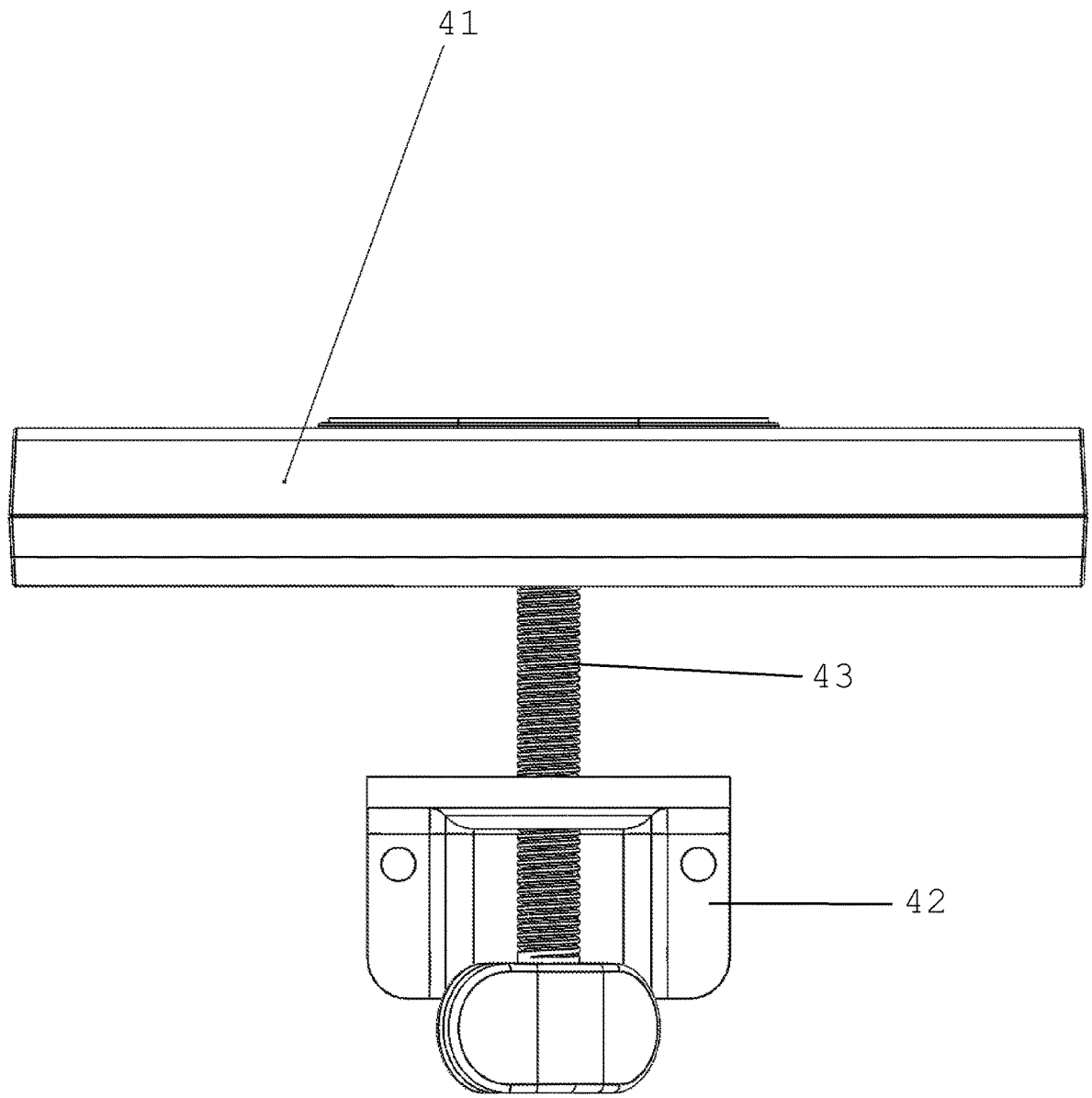
FIG. 16 is a front view of an embodiment of the lower dock subassembly of the computer docking station shown in FIG. 1.

Referring now to FIG. 15, in an exemplary embodiment data port 55 can comprise a DC power connector through which power is supplied to the lower dock subassembly 40. Data port 56 can comprise USB-A 3.0 SS data bridge cable connector capable of being mated to the bridge cable 6 for transferring data between the upper subassembly PCBA 22 of the upper dock subassembly 20 and the lower subassembly PCBA 45 of the lower dock subassembly 40. Alternatively, Data port 56 can comprise a USB-C connector or can be replaced with a wireless communication mechanism. Data port 57 can comprise a USB-A mini 3.0 audio combo bridge cable connector or a USB-C port/connector to allow the transfer of audio data between the upper dock subassembly 20 and the lower dock subassembly 40. Lastly, data port 58 can comprise a DC power bridge cable connector, or alternatively a USB-C connector, for providing power to the upper dock subassembly 20 and attached laptop.

Figure 17:
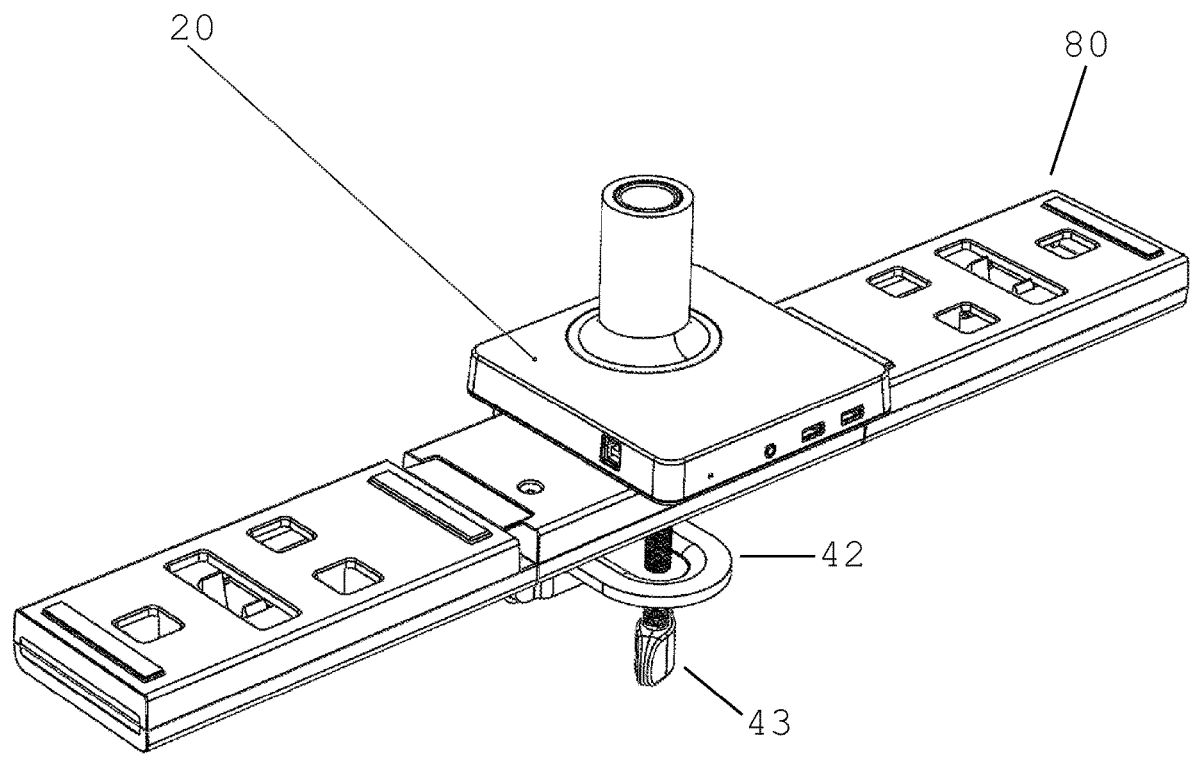
FIG. 17 is a front perspective view of the computer docking station shown in FIG. 1 further comprising an embodiment of a cable management system attached to either side of the lower dock subassembly.
Figure 18:
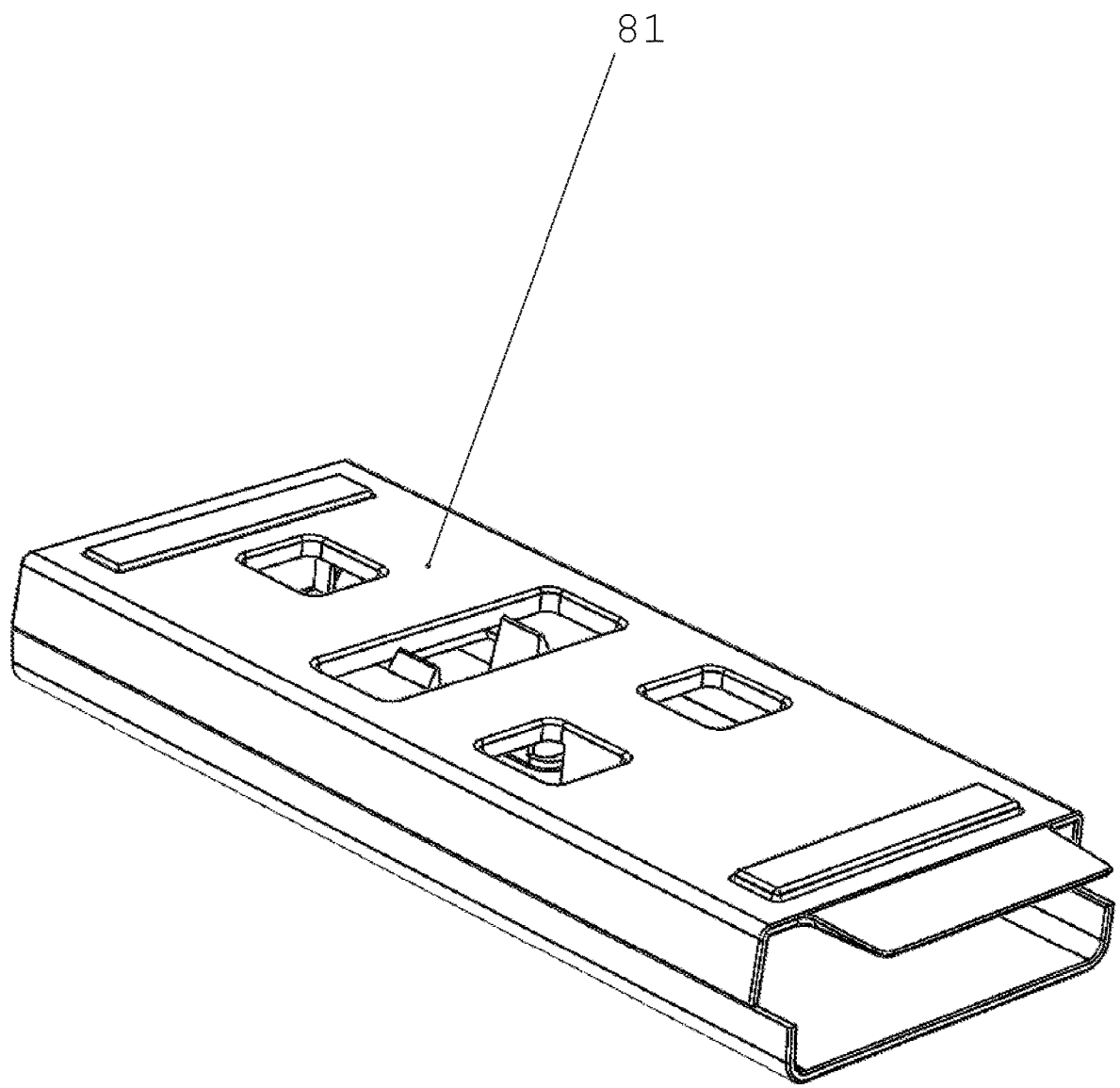
FIG. 18 is a partial rear perspective view of the cable management system shown in FIG. 17.
Figure 19:
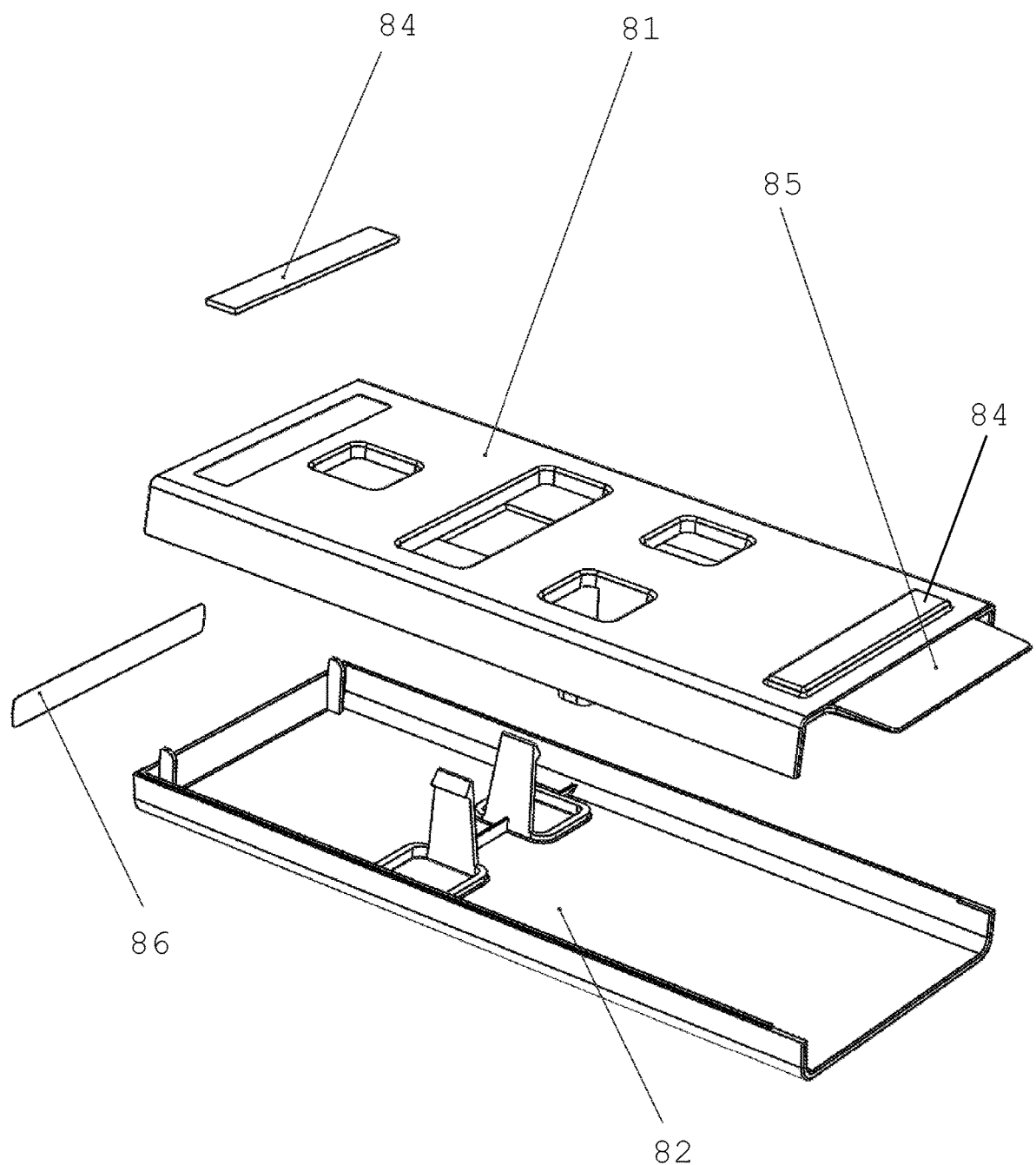
FIG. 19 is an exploded rear perspective view of the cable management system shown in FIG. 18.
Figure 20:
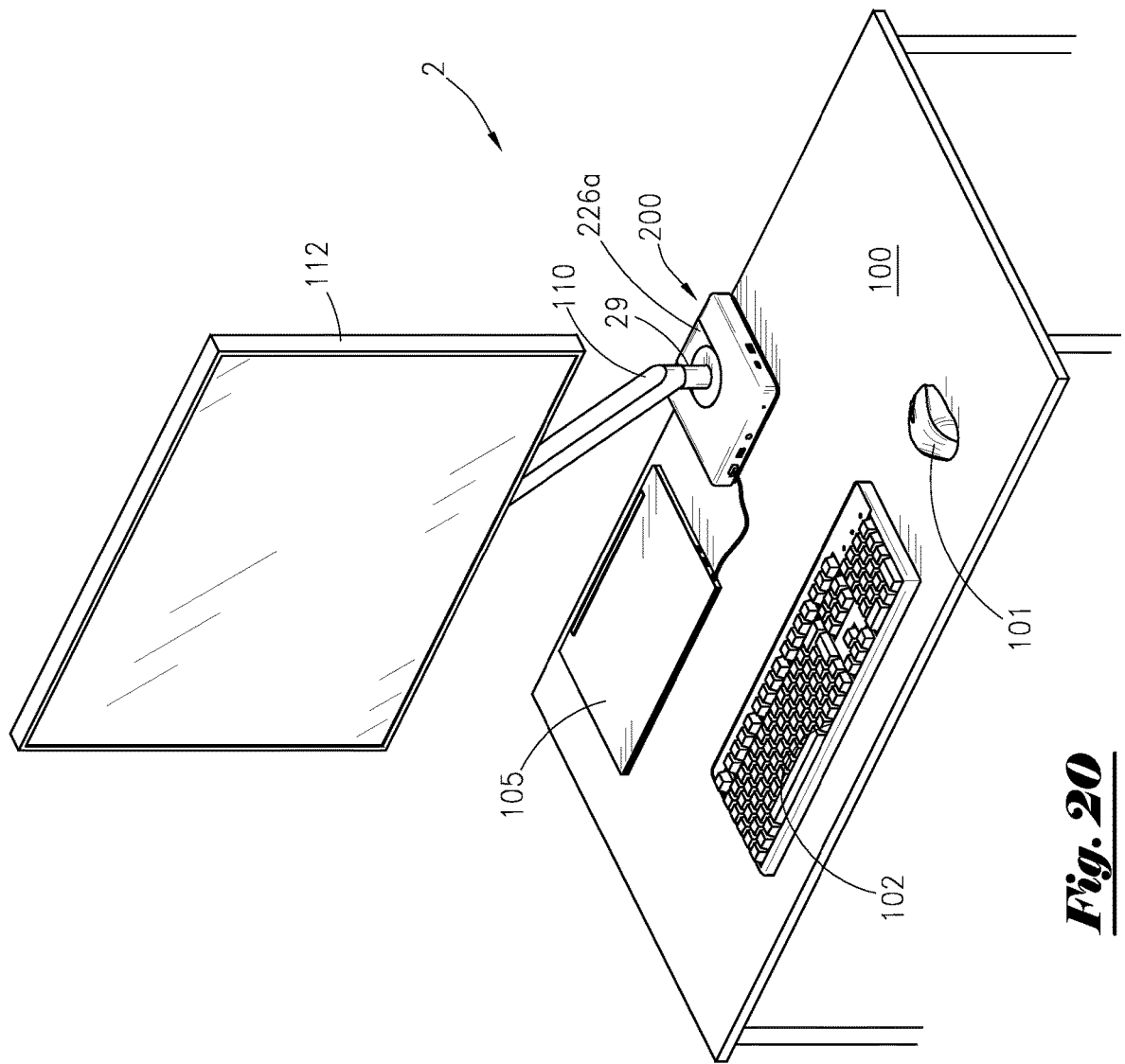
FIG. 20 is a front perspective view of an alternative embodiment of a computer docking station embodying principles of the present invention wherein the computer docking station is mounted to a table.
Figure 21:
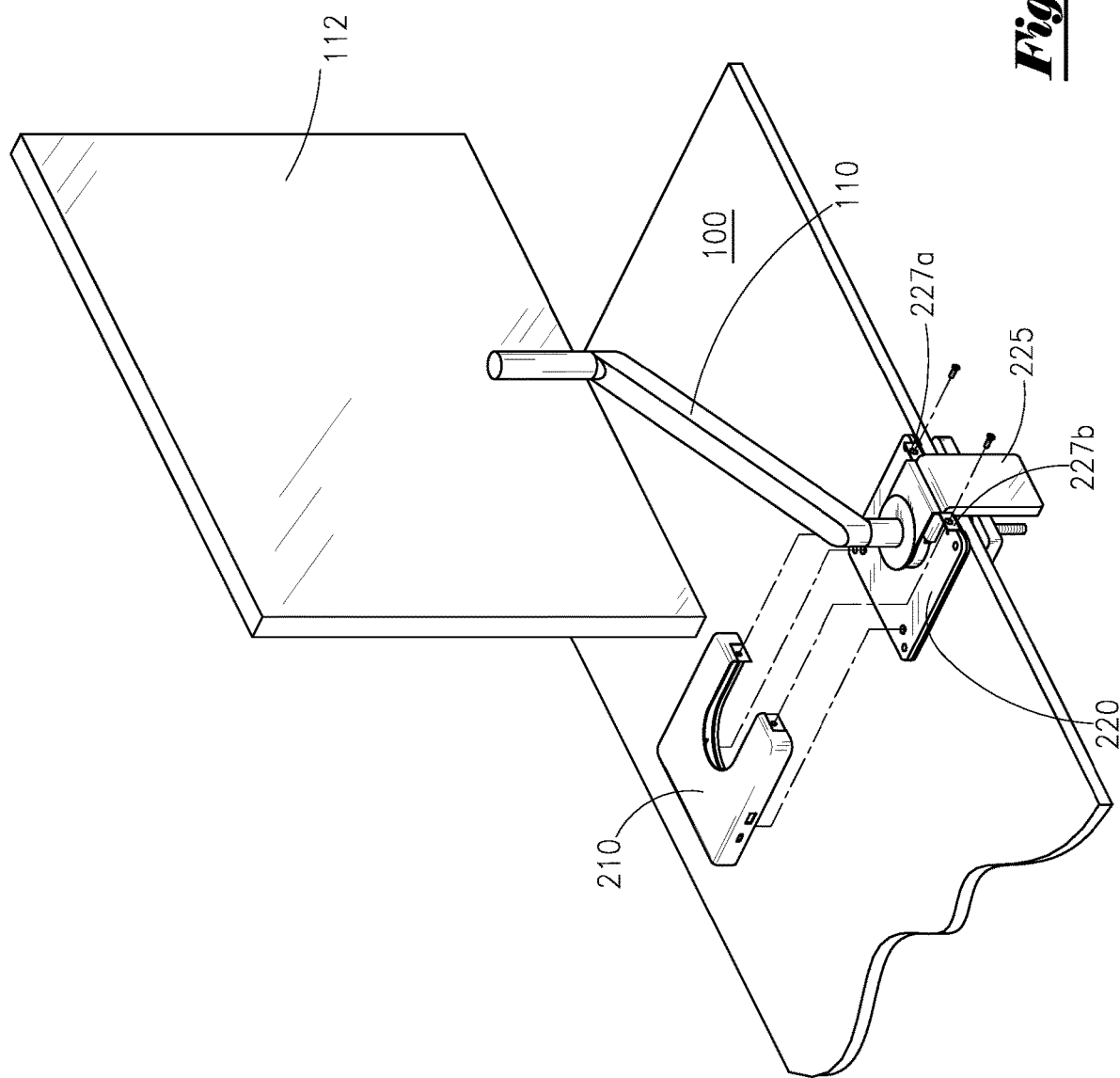
FIG. 21 is a rear perspective view of the alternative embodiment of the computer docking station depicted in FIG. 20.
Figure 22:
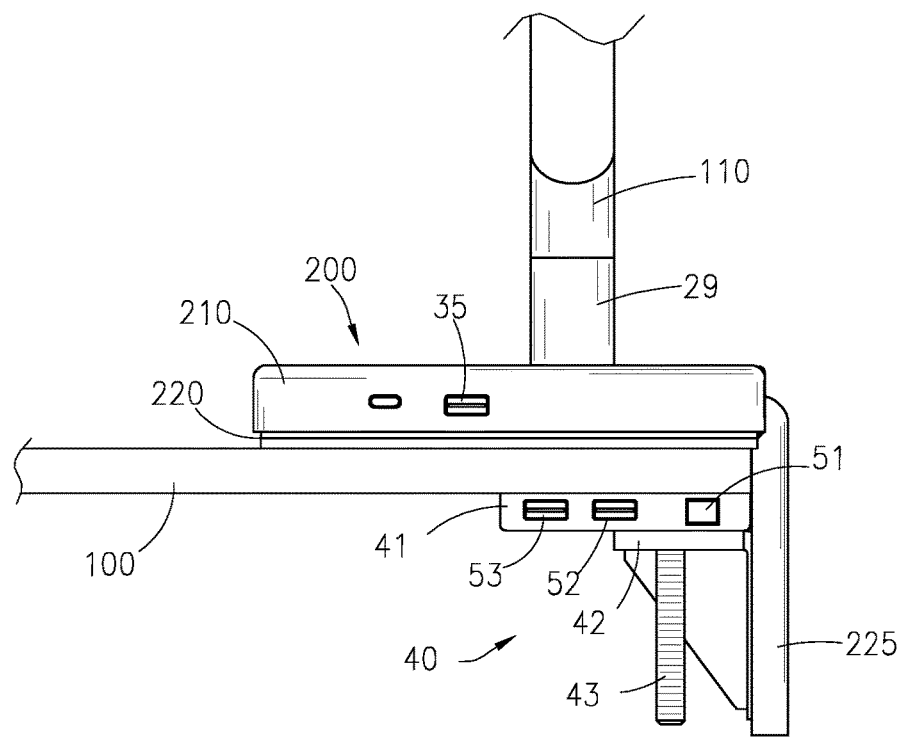
FIG. 22 is a right side view of the alternative embodiment of the computer docking station depicted in FIG. 20 wherein the removable data port hub of the upper dock subassembly is mounted to the mounting plate of the upper dock subassembly.
Figure 23:
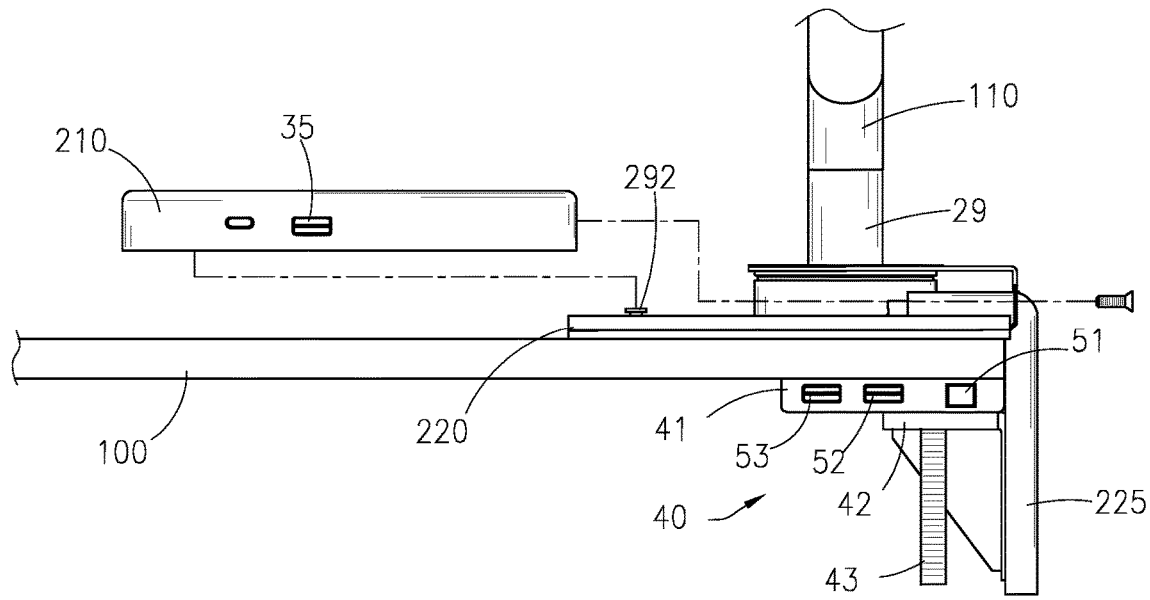
FIG. 23 is a right side view of the alternative embodiment of the computer docking station depicted in FIG. 20 wherein the removable data port hub of the upper dock subassembly is removed from the mounting plate of the upper dock subassembly.

Referring now to FIGS. 17-19, the computer docking station 1 can further comprise a cable management enclosure 80 attached to either, or both, sides of the lower dock subassembly 40. The cable management enclosure 80 features an upper cable housing 81 mated with snap joints to a lower lid 82. The upper housing 81 preferably has three internal hooks allowing the user to wrap any cable slack around the hooks for storage within the cable management enclosure 80. Adhesive or mechanical-based fastening strips 84 (e.g., hook and loop fasteners) can be utilized to secure the upper cable housing 81 to the undersurface of the work surface 100. The cable management enclosure 80 may also contain an alignment tab 85 for aligning and securing the cable housing 81 to the lower dock subassembly 41 of the lower dock subassembly 40. A flexible hinge insert 86 can be utilized to releasably connect the lower lid 82 to the cable housing 81 so as to allow a user to access the cable management enclosure 80 by folding down the lower lid 82.

Referring to FIGS. 20-24, an alternative embodiment of a computer docking station 2 is depicted. The computer docking station 2 features an upper dock subassembly 200 having a removable data port hub 210. By having a data port hub 210 that can be selectively detached from the remainder of the upper dock subassembly 200, the computer docking station 2 provides users the benefit of more easily removing the upper subassembly printed circuit board assembly (PCBA) 210b (e.g., for repair or replacement) without having to disassemble the entire computer docking station and attached peripherals. The computer docking station 2 also provides users the benefit of more easily removing the upper subassembly PCBA) 210b for updating the hardware or firmware and allowing a migration path for when technology is obsoleted/outdated and need to be replaced with new standards.

The computer docking station 2 depicted in FIGS. 20-24 may comprise an upper dock subassembly 200 operatively connected to a lower dock subassembly 40. The upper dock subassembly 200 is designed to house active data port connectors (i.e., frequently connected/disconnected ports such as data ports 32-36), while the lower dock subassembly 40 is designed to house passive data port connectors (i.e., infrequently connected/disconnected). The upper dock subassembly 200 can be operatively connected to the lower dock subassembly via a bridge cable 6 (e.g., see FIGS. 2 and 5) or via a wireless connection. In the embodiment depicted in FIGS. 20-24, a bracket 225 is utilized to connect the upper dock subassembly 200 to the lower dock subassembly 40. A clamp or other known attachment mechanism can be utilized to secure both subassemblies to a work surface or table 100.

The upper dock subassembly 200 can include a removable data port hub 210 and a mounting plate 220. The removable data port hub 210 is designed to be releasably coupled to the mounting plate 220. A monitor arm mount 29 can be either attached to, or integrated into, the top of mounting plate 220, while an upper portion of the bracket 225 is preferably attached to the rear or bottom of the mounting plate 220. A monitor arm 110 can be connected to the monitor arm mount 29, with one or more computer monitors 112 mounted to the monitor arm 110. A mouse 101, a keyboard 102, a laptop 105 and other computer peripherals may be connected to the active data port connectors (data ports 32-36) of the removable data port hub 210 or lower dock subassembly 40.

Still referring to FIGS. 20-24, the removable data port hub 210 can comprise a hub cover 210a, an upper subassembly PCBA 210b, and a hub base 210c. Alternatively, the removable data port hub 210 can comprise a hub cover 210a and an upper subassembly PCBA 210b. One or more fasteners can be used to connect the hub cover 210a to the hub base 210c, thereby forming a housing for the upper subassembly PCBA 210b. The upper subassembly PCBA 210b can comprise one or more data ports 32-36 accessible through apertures in the hub cover 210a. In one embodiment, a bracket 225 and first and second L-shaped lock tabs 227a, 227b can be attached to the mounting plate 220. Both the bracket 225 and the first and second L-shaped lock tabs 227a, 227b can be attached to the mounting plate 220 via fasteners or other means known in the art. A pad 224 optionally can be mounted below the mounting plate 220 to protect the work surface 100. A spacer 228 optionally can be mounted above the mounting plate 220 to provide a mounting point for the monitor arm mount 29. An upper bracket cover 226a and a lower bracket cover 226b can be positioned adjacent to the bracket 225 to cover the fasteners connecting the underlying components of the upper dock subassembly 220.

The lower dock subassembly 40 depicted in FIGS. 20-24 is similar in function and design to the lower dock subassembly 40 depicted in FIGS. 1-19. The lower dock subassembly 40 can include a lower subassembly PCBA 45 positioned within a lower dock housing 41. A means for securing the lower dock subassembly 40 to the bottom of a work surface 100 can comprise a clamp support or bracket 42 and one or more screws 43. The lower dock subassembly 41 and clamp support 42 can be attached to the lower portion of the bracket 225 with one or more fasteners. Meanwhile, the screws 43 can each have a clamp foot 43 attached to their distal end for engaging the bottom of the work surface 100. In order to secure the computer docking station 2 to a work surface or table 100, the user can threadingly engage the screws 43 with the threaded apertures in the clamp support 42 and then rotate the screw 43 until the screw's distal end comes into contact with the underside of the work surface 100.

The removable data port hub 210 can be mated to the mounting plate 220 by placing the data port hub 210 adjacent to the mounting plate 220 and then causing the pins 291, 292 to engage the eye portion of the respective key slots 211, 212. To lock the data port hub 210 into position, the data port hub 210 can then be slid towards the bracket 225 to cause the pins 291, 292 to move into the slot portion of the key slots 211, 212, thereby mating the data port hub 210 to the mounting plate 220. To lock the data port hub 210 into the mated position, the first and second fasteners 228a, 228b can be extended through apertures in the first and second lock tabs 227a, 227b to engage threaded apertures in the rear portion of the hub cover 210. The active data port connectors of the upper dock subassembly 200 then can be linked to the internal components of the lower dock subassembly 40 by coupling the bridge cable 6 to the upper subassembly PCBA 210b of the removable data port hub 210. In alternative embodiments, multiple bridge cables 6 can be utilized to link the various data ports, or the bridge cable(s) 6 can be replaced with wireless connection.

The foregoing description and accompanying drawings illustrate the principles, exemplary embodiments, and modes of operation of the invention. However, the invention should not be construed as being limited to the particular embodiments discussed above. Many modifications of the embodiments described herein will come to mind to one skilled in the art having the benefit of the teaching presented in the foregoing descriptions and the associated drawings. Accordingly, it should be appreciated that variations to those embodiments can be made by those skilled in the art without departing from the scope of the invention.

What is claimed is:

1. A computer docking station comprising:
a) an upper dock subassembly adapted to be positioned on top of a work surface, the upper dock subassembly comprising: i) a data port hub comprising a hub cover, a hub base, and an upper subassembly printed circuit board assembly (PCBA) having one or more active data ports, wherein the hub cover is attached to the hub base to form an upper dock housing for the upper subassembly PCBA; and ii) a monitor arm mount positioned adjacent to the data port hub and extending vertically therefrom;
b) a lower dock subassembly operatively connected to the upper dock subassembly and adapted to be positioned beneath the work surface, the lower dock subassembly comprising a lower subassembly printed circuit board assembly (PCBA) positioned within a lower dock housing, wherein the lower subassembly PCBA comprises one or more passive data ports.

2. The computer docking station of claim 1, wherein the upper dock subassembly further comprises a mounting plate having a top surface and a bottom surface, wherein the data port hub is adapted to be releasably attached to the top surface of the mounting plate.

3. The computer docking station of claim 2, wherein the mounting plate comprises first and second pins protruding from the top surface of the mounting plate.

4. The computer docking station of claim 3, wherein the hub base comprises first and second key slots, wherein the first key slot is adapted to receive the first pin and the second key slot is adapted to receive the second pin when the removable data port hub is positioned adjacent to the mounting plate.

5. The computer docking station of claim 4, wherein the upper dock subassembly further comprises first and second L-shaped lock tabs, wherein the first and second L-shaped lock tabs each define a vertical portion and a horizontal portion, wherein the horizontal portions of the first and second L-shaped lock tabs are each attached to a rear portion of the mounting plate, and wherein the vertical portions of the first and second L-shaped lock tabs are each releasably attached to a rear portion of the hub cover of the data port hub.

6. The computer docking station of claim 5, wherein the one or more active data ports comprise a first active data port, a second active data port, and a third active data port.

7. The computer docking station of claim 6, wherein the first active data port is selected from a group consisting of an audio port, a USB data port, and a USB charging port.

8. The computer docking station of claim 6, wherein the second active data port is selected from a group consisting of an audio port, a USB data port, and a USB charging port.

9. The computer docking station of claim 6, wherein the third active data port is selected from a group consisting of an audio port, a USB data port, and a USB charging port.

10. The computer docking station of claim 5, wherein the one or more passive data ports comprise a first passive data port, a second passive data port, and a third passive data port.

11. The computer docking station of claim 10, wherein the first passive data port is selected from the group consisting of an Ethernet connector, a display port connector, an HDMI connector, a DVI connector, a USB port, and a DC power connector.

12. The computer docking station of claim 10, wherein the second passive data port is selected from the group consisting of an Ethernet connector, a display port connector, an HDMI connector, a DVI connector, a USB port, and a DC power connector.

13. The computer docking station of claim 10, wherein the third passive data port is selected from the group consisting of an Ethernet connector, a display port connector, an HDMI connector, a DVI connector, a USB port, and a DC power connector.

14. A computer docking station comprising:
a) a bracket having an upper portion and a lower portion;
b) an upper dock subassembly coupled to the upper portion of the bracket and adapted to be positioned on top of a work surface, the upper dock subassembly comprising: i) a mounting plate having a top surface and a bottom surface; ii) a data port hub releasably coupled to the top surface of the mounting plate, wherein the data port hub comprises a hub cover, a hub base, and an upper subassembly printed circuit board assembly (PCBA) positioned between the hub cover and hub base, wherein the upper subassembly PCBA comprises one or more active data ports;
c) a lower dock subassembly coupled to the lower portion of the bracket and adapted to be positioned beneath the work surface, the lower dock subassembly comprising a lower subassembly printed circuit board assembly (PCBA) positioned within a lower dock housing, wherein the lower subassembly PCBA comprises one or more passive data ports.

15. The computer docking station of claim 14, wherein the mounting plate comprises first and second pins protruding from the top surface of the mounting plate.

16. The computer docking station of claim 15, wherein the hub base comprises first and second key slots, wherein the first key slot is adapted to receive the first pin and the second key slot is adapted to receive the second pin when the removable data port hub is positioned adjacent to the mounting plate.

17. The computer docking station of claim 16, wherein the upper dock subassembly further comprises first and second L-shaped lock tabs, wherein the first and second L-shaped lock tabs each define a vertical portion and a horizontal portion, wherein the horizontal portions of the first and second L-shaped lock tabs are each attached to a rear portion of the mounting plate, and wherein the vertical portions of the first and second L-shaped lock tabs are each releasably attached to a rear portion of the hub cover of the data port hub.

18. The computer docking station of claim 14, wherein the upper dock subassembly further comprises a monitor arm mount attached to the mounting plate.

19. The computer docking station of claim 18, wherein the upper dock subassembly further comprises a spacer positioned between the monitor arm mount and the mounting plate.

20. The computer docking station of claim 14, wherein the lower dock subassembly further comprises a clamp support attached to the lower portion of the bracket.

* * * * *